US011716766B2

(12) United States Patent
Taherzadeh Boroujeni et al.

(10) Patent No.: US 11,716,766 B2
(45) Date of Patent: Aug. 1, 2023

(54) EXPOSURE-DEPENDENT RANDOM ACCESS CHANNEL PROCEDURE SELECTION

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/206,095

(22) Filed: Mar. 18, 2021

(65) Prior Publication Data

US 2021/0298084 A1 Sep. 23, 2021

Related U.S. Application Data

(60) Provisional application No. 62/992,760, filed on Mar. 20, 2020.

(51) Int. Cl.
*H04W 74/08* (2009.01)
*H04W 48/02* (2009.01)

(52) U.S. Cl.
CPC ....... *H04W 74/0833* (2013.01); *H04W 48/02* (2013.01)

(58) Field of Classification Search
None
See application file for complete search history.

(56) References Cited

U.S. PATENT DOCUMENTS

| 2019/0132882 | A1* | 5/2019 | Li ..................... H04W 74/0833 |
| 2019/0238202 | A1* | 8/2019 | Chavva ................ H04B 7/0617 |
| 2021/0100028 | A1* | 4/2021 | Ly .......................... H04W 24/10 |
| 2021/0259025 | A1* | 8/2021 | Akkarakaran ........ H04W 72/21 |
| 2021/0266976 | A1* | 8/2021 | Taherzadeh Boroujeni ................ H04W 74/0833 |
| 2021/0297104 | A1* | 9/2021 | Zhou ...................... H04W 76/28 |
| 2021/0297959 | A1* | 9/2021 | Zhou .................... H04B 7/0691 |
| 2021/0298084 | A1* | 9/2021 | Taherzadeh Boroujeni ................ H04W 74/0833 |
| 2022/0167422 | A1* | 5/2022 | Hakola ............. H04W 74/0833 |
| 2022/0183081 | A1* | 6/2022 | Tao ........................ H04W 74/02 |
| 2022/0191940 | A1* | 6/2022 | MolavianJazi ...... H04B 17/318 |
| 2022/0256473 | A1* | 8/2022 | Kiilerich Pratas .. H04W 52/283 |

* cited by examiner

*Primary Examiner* — Faiyazkhan Ghafoerkhan
(74) *Attorney, Agent, or Firm* — Danai Nelisile Mhembere; Holland & Hart LLP

(57) ABSTRACT

Methods, systems, and devices for wireless communications are described. In some implementations, a UE may determine that a maximum permissible exposure (MPE) restriction applies to UE transmissions, and the UE may transmit at a lower power to meet the restriction. The UE may be configured to account for lower power transmission when selecting between a two-step or a four-step random access channel (RACH) procedure. In some cases, the UE may identify a RACH procedure selection rule for selecting between the two-step RACH procedure and the four-step RACH procedure based on whether an exposure condition (e.g., MPE restriction) is identified. The selection rule may indicate one or more synchronization signal block based reference signal received power thresholds to be used by the UE to select between the two-step RACH procedure and four-step RACH procedure. The UE may perform the selected RACH procedure.

30 Claims, 16 Drawing Sheets

EXPOSURE-DEPENDENT RANDOM ACCESS CHANNEL PROCEDURE SELECTION

CROSS REFERENCE

The present Application for Patent claims the benefit of U.S. Provisional Patent Application No. 62/992,760 by TAHERZADEH BOROUJENI et al., entitled "EXPOSURE-DEPENDENT RANDOM ACCESS CHANNEL PROCEDURE SELECTION," filed Mar. 20, 2020, assigned to the assignee hereof, and expressly incorporated by reference herein.

FIELD OF TECHNOLOGY

The following relates generally to wireless communications and more specifically to an exposure-dependent random access channel (RACH) procedure selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may use a random-access channel (RACH) procedure to establish a connection with a base station, to identify suitable parameters and configurations for communications with the base station, or to perform additional actions. Conventional techniques for establishing connectivity using a RACH procedure may be improved.

SUMMARY

The described techniques relate to improved methods, systems, devices, and apparatuses that support an exposure-dependent random access channel (RACH) procedure selection. Generally, the described techniques provide for a more accurate and reliable selection of a RACH procedure by a UE. For example, the UE may be configured to select a RACH procedure based on whether an exposure condition is identified. In some examples, a UE may determine that a maximum permissible exposure (MPE) restriction applies to a UE transmission based on, for example, detection of a body part near to an antenna panel (e.g., at least partially blocking the antenna panel). As such, the UE may transmit at a lower power to comply with the MPE restriction. The UE may be configured to account for lower power transmissions when selecting a RACH procedure. In some cases, a UE may identify a RACH procedure selection rule for selecting between a first RACH procedure and a second RACH procedure (e.g., two-step RACH, four-step RACH, etc.) based on whether an exposure condition (e.g., MPE restriction) is identified. In some cases, a selection rule may specify a value for a synchronization signal block (SSB) based reference signal received power (RSRP) threshold to use based on whether the MPE condition is identified. The UE may select between the first RACH procedure (e.g., two-step RACH procedure) and the second RACH procedure (e.g., four-step RACH procedure) based on the RACH procedure selection rule and may perform the selected RACH procedure based on the selecting.

A method of wireless communications by a user equipment is described. The method may include identifying a RACH procedure selection rule for selecting between a two-step RACH procedure and a four-step RACH procedure based on whether an exposure condition is identified, selecting between the two-step RACH procedure and the four-step RACH procedure based on the RACH procedure selection rule, and performing the selected RACH procedure based on the selecting.

An apparatus for wireless communications by a user equipment is described. The apparatus may include a processor, memory coupled with the processor, and instructions stored in the memory. The instructions may be executable by the processor to cause the apparatus to identify a RACH procedure selection rule for selecting between a two-step RACH procedure and a four-step RACH procedure based on whether an exposure condition is identified, to select between the two-step RACH procedure and the four-step RACH procedure based on the RACH procedure selection rule, and to perform the selected RACH procedure based on the selecting.

Another apparatus for wireless communications by a user equipment is described. The apparatus may include means for identifying a RACH procedure selection rule for selecting between a two-step RACH procedure and a four-step RACH procedure based on whether an exposure condition is identified, means for selecting between the two-step RACH procedure and the four-step RACH procedure based on the RACH procedure selection rule, and means for performing the selected RACH procedure based on the selecting.

A non-transitory computer-readable medium storing code for wireless communications by a user equipment is described. The code may include instructions executable by a processor to identify a RACH procedure selection rule for selecting between a two-step RACH procedure and a four-step RACH procedure based on whether an exposure condition is identified, to select between the two-step RACH procedure and the four-step RACH procedure based on the RACH procedure selection rule, and to perform the selected RACH procedure based on the selecting.

In some examples of the method, apparatuses, and non-transitory computer-readable medium described herein, identifying the RACH procedure selection rule may include operations, features, means, or instructions for receiving control signaling that indicates the RACH procedure selection rule.

In some examples of the method, apparatuses, and non-transitory computer-readable medium described herein, receiving the control signaling may include operations, features, means, or instructions for receiving control signaling that includes system information that indicates the RACH procedure selection rule.

In some examples of the method, apparatuses, and non-transitory computer-readable medium described herein, identifying the RACH procedure selection rule may include operations, features, means, or instructions for identifying the RACH procedure selection rule that indicates a threshold for selecting between the two-step RACH procedure and the four-step RACH procedure when the exposure condition is or is not identified.

In some examples of the method, apparatuses, and non-transitory computer-readable medium described herein, identifying the RACH procedure selection rule may include operations, features, means, or instructions for identifying the RACH procedure selection rule that indicates a first threshold for selecting between the two-step RACH procedure and the four-step RACH procedure when the exposure condition is identified and a second threshold for selecting between the two-step RACH procedure and the four-step RACH procedure when the exposure condition is not identified.

In some examples of the method, apparatuses, and non-transitory computer-readable medium described herein, identifying the RACH procedure selection rule may include operations, features, means, or instructions for receiving control signaling that indicates the RACH procedure selection rule that indicates the first threshold, the second threshold, or both.

In some examples of the method, apparatuses, and non-transitory computer-readable medium described herein, identifying the RACH procedure selection rule may include operations, features, means, or instructions for receiving control signaling that indicates the RACH procedure selection rule that indicates the first threshold.

Some examples of the method, apparatuses, and non-transitory computer-readable medium described herein may further include operations, features, means, or instructions for identifying the second threshold based on the first threshold.

In some examples of the method, apparatuses, and non-transitory computer-readable medium described herein, identifying the RACH procedure selection rule may include operations, features, means, or instructions for receiving control signaling that indicates the RACH procedure selection rule that indicates the second threshold.

Some examples of the method, apparatuses, and non-transitory computer-readable medium described herein may further include operations, features, means, or instructions for identifying the first threshold based on the second threshold.

In some examples of the method, apparatuses, and non-transitory computer-readable medium described herein, identifying the RACH procedure selection rule may include operations, features, means, or instructions for identifying the RACH procedure selection rule that indicates a first frequency band in which to apply the first and second thresholds.

In some examples of the method, apparatuses, and non-transitory computer-readable medium described herein, identifying the RACH procedure selection rule may include operations, features, means, or instructions for identifying the RACH procedure selection rule that indicates a second frequency band in which to apply at least a third threshold for selecting between the two-step RACH procedure and the four-step RACH procedure.

A method of wireless communications by a base station is described. The method may include transmitting, to a UE, control signaling indicating a RACH procedure selection rule for selecting between a two-step RACH procedure and a four-step RACH procedure based on whether an exposure condition is identified and performing one of the two-step RACH procedure or the four-step RACH procedure with the UE based on the RACH procedure selection rule.

An apparatus for wireless communications by a base station is described. The apparatus may include a processor, memory coupled with the processor, and instructions stored in the memory. The instructions may be executable by the processor to cause the apparatus to transmit, to a UE, control signaling indicating a RACH procedure selection rule for selecting between a two-step RACH procedure and a four-step RACH procedure based on whether an exposure condition is identified and to perform one of the two-step RACH procedure or the four-step RACH procedure with the UE based on the RACH procedure selection rule.

Another apparatus for wireless communications by a base station is described. The apparatus may include means for transmitting, to a UE, control signaling indicating a RACH procedure selection rule for selecting between a two-step RACH procedure and a four-step RACH procedure based on whether an exposure condition is identified and means for performing one of the two-step RACH procedure or the four-step RACH procedure with the UE based on the RACH procedure selection rule.

A non-transitory computer-readable medium storing code for wireless communications by a base station is described. The code may include instructions executable by a processor to transmit, to a UE, control signaling indicating a RACH procedure selection rule for selecting between a two-step RACH procedure and a four-step RACH procedure based on whether an exposure condition is identified and to perform one of the two-step RACH procedure or the four-step RACH procedure with the UE based on the RACH procedure selection rule.

In some examples of the method, apparatuses, and non-transitory computer-readable medium described herein, transmitting the control signaling may include operations, features, means, or instructions for transmitting the control signaling that includes system information that indicates the RACH procedure selection rule.

In some examples of the method, apparatuses, and non-transitory computer-readable medium described herein, transmitting the control signaling may include operations, features, means, or instructions for transmitting the control signaling that indicates the RACH procedure selection rule that indicates a threshold for selecting between the two-step RACH procedure and the four-step RACH procedure when the exposure condition is or is not identified.

In some examples of the method, apparatuses, and non-transitory computer-readable medium described herein, transmitting the control signaling may include operations, features, means, or instructions for transmitting the control signaling that indicates the RACH procedure selection rule that indicates a first threshold for selecting between the two-step RACH procedure and the four-step RACH procedure when the exposure condition is identified and a second threshold for selecting between the two-step RACH procedure and the four-step RACH procedure when the exposure condition is not identified.

In some examples of the method, apparatuses, and non-transitory computer-readable medium described herein, transmitting the control signaling may include operations, features, means, or instructions for transmitting the control signaling that indicates the RACH procedure selection rule that indicates a first frequency band in which to apply the first and second thresholds.

In some examples of the method, apparatuses, and non-transitory computer-readable medium described herein, transmitting the control signaling may include operations, features, means, or instructions for transmitting the control signaling that indicates the RACH procedure selection rule that indicates a second frequency band in which to apply at least a third threshold for selecting between the two-step RACH procedure and the four-step RACH procedure.

In some examples of the method, apparatuses, and non-transitory computer-readable medium described herein, transmitting the control signaling may include operations, features, means, or instructions for transmitting the control signaling that indicates the RACH procedure selection rule that indicates a first threshold, a second threshold, or both.

DETAILED DESCRIPTION

Figure 1:
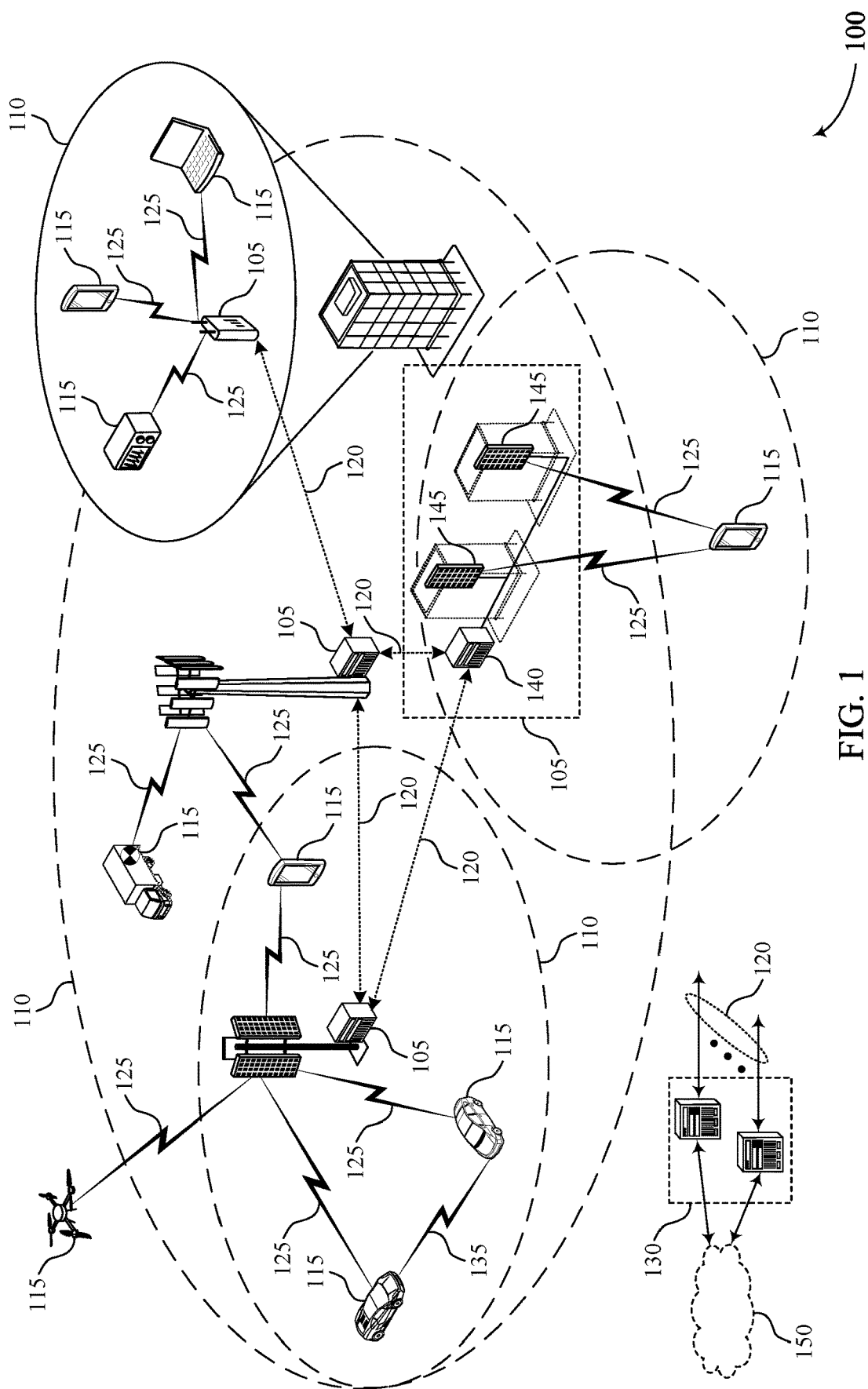
FIG. 1 illustrates an example of a system for wireless communications in accordance with aspects of the present disclosure.

In some wireless communication systems, a user equipment (UE) and a base station may establish communication using a random access procedure. For instance, the random access procedure may include a series of handshake messages communicated between the UE and the base station as part of a random access channel (RACH) procedure. In some examples, random access procedures may be used when a UE has data to transmit but does not have uplink resources assigned. In other examples, random access procedures may be used when the UE is handed over from a source base station to a target base station. In any event, the random access procedures may enable the UE to synchronize with the network and communicate with the base station.

In some cases, the UE may select a two-step RACH procedure or a four-step RACH procedure based on a reference signal received power (RSRP) of a synchronization signal block (SSB) transmitted from a base station, where the measured RSRP may indicate a quality of the channel between the UE and the base station. In some cases, the SSB RSRP may be an unreliable metric on which to base the RACH procedure selection and may result in an inefficient RACH procedure performed by the UE and base station.

In some systems, a UE may be configured to select a two-step RACH procedure or a four-step RACH procedure depending on an SSB-based RSRP. The RSRP based selection may assume that the UE is transmitting at high power (e.g., maximum power) and may result in an unreliable RACH procedure selection in cases that the UE does not transmit at high power. For example, a UE may determine that it is in contact with a portion of a user's body (e.g., hand, finger, head). As such, a maximum permissible exposure (MPE) restriction on transmission power may apply, and the UE may transmit at lower power to comply with the MPE restriction. Under conventional systems, a UE may not account for these restrictions and select a RACH procedure as if the UE were transmitting at high powers. As such, the UE may select a RACH procedure that performs worse than expected under current wireless channel conditions.

The described techniques relate to a UE that may dynamically select between a two-step RACH procedure and a four-step RACH procedure based on one or more metrics (e.g., SSB RSRP, MPE restrictions, etc.). In some cases, the UE may consider whether MPE restrictions apply (e.g., based on whether body contact, such as hand blockage of an antenna, is identified). If MPE restrictions apply, the UE may select a RACH procedure based on a RACH procedure selection rule associated with the MPE restriction. In some cases, the RACH procedure selection rule may be based fully or partially on the MPE restriction (e.g., also based on the MPE restriction and an SSB-based RSRP threshold). If MPE restrictions do not apply, the UE may select the RACH procedure based on a RACH procedure selection rule associated with the SSB-based RSRP measurement.

Particular aspects of the subject matter described herein may be implemented to realize one or more advantages. The described techniques may support improvements in a RACH procedure by improving reliability of the RACH procedure, among other advantages. As such, supported techniques may include improved network operations and, in some examples, may promote network efficiencies, among other benefits.

Aspects of the disclosure are initially described in the context of wireless communications systems. Aspects are the described with respect to a four-step RACH procedure, a two-step RACH procedure, and a process flow. Aspects of the disclosure are further illustrated by and described with reference to apparatus diagrams, system diagrams, and flowcharts that relate to exposure-dependent RACH procedure selection.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals (SSs), system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

To improve the selection of a RACH procedure by a UE, the UE may be configured to select a RACH procedure based on more than one metric. In some implementations, a UE may determine whether MPE restrictions apply to UE transmissions and may select a RACH procedure accordingly. If MPE restrictions apply, the UE may transmit at lower power as compared when such restrictions do not apply. The UE may be configured to account for these lower power transmissions when selecting a RACH procedure. In some cases, a UE may identify a RACH procedure selection rule for selecting between a first RACH procedure and a second RACH procedure (e.g., two-step RACH, four-step RACH, etc.) based on whether an exposure condition (e.g., MPE restriction) is identified. In some cases, a selection rule may include an SSB based RSRP threshold. The UE may select between the two-step RACH procedure and the four-step RACH procedure based on the RACH procedure selection rule and may perform the selected RACH procedure based on the selecting.

Figure 2:
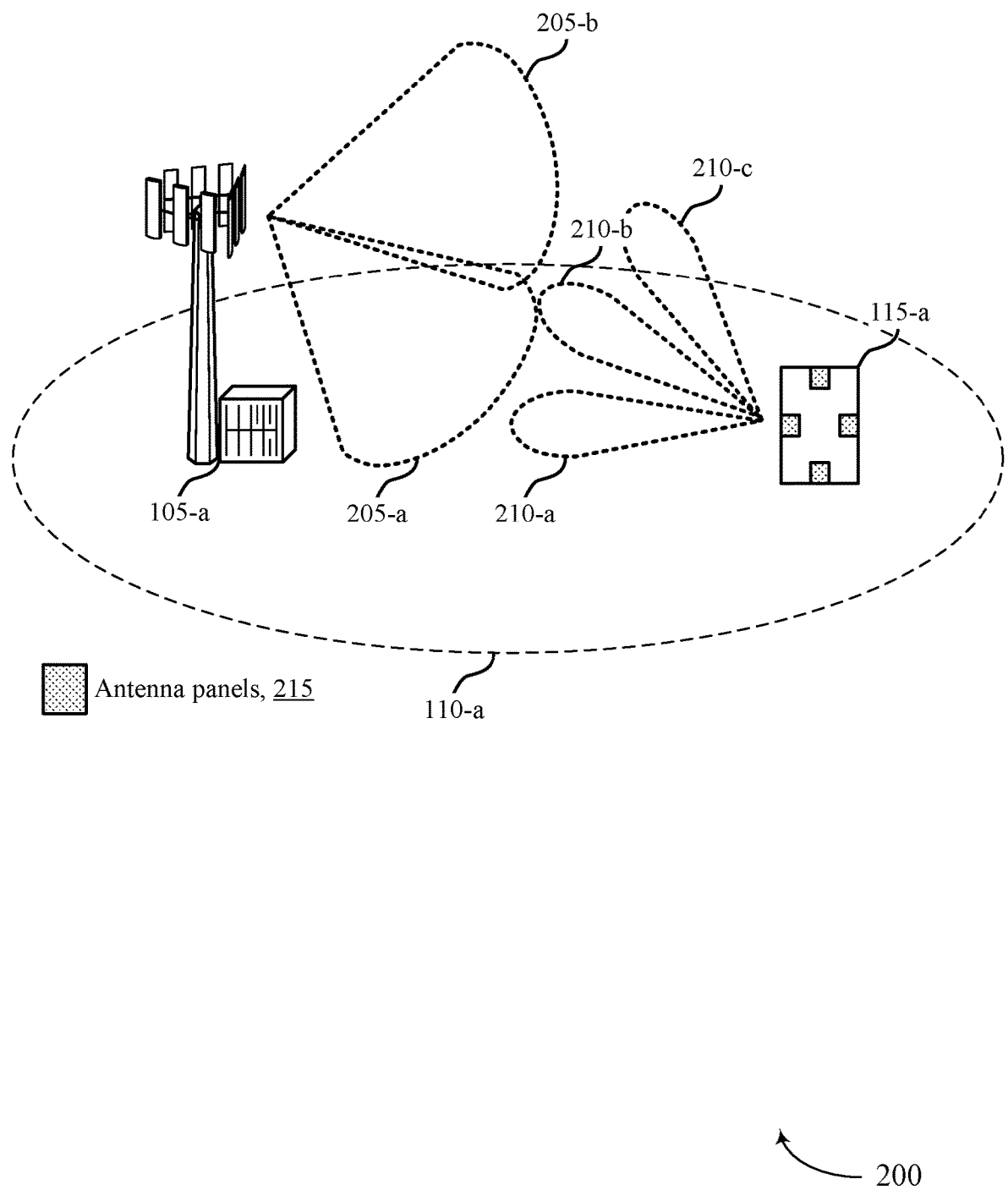
FIG. 2 illustrates an example of a system for wireless communications in accordance with aspects of the present disclosure.

FIG. 2 illustrates an example of a wireless communications system 200 in accordance with aspects of the present disclosure. The wireless communications system 200 may include a base station 105-a and a UE 115-a, which may be examples of a base station 105 and a UE 115, respectively, as described with reference to FIG. 1. Base station 105-a may serve a geographic coverage area 110-a. In some cases, UE 115-a may implement an MPE based RACH selection. For example, UE 115-a may select between a two-step RACH procedure or a four-step RACH procedure based on whether MPE restrictions are identified. Additionally or alternatively, other wireless devices, such as base station 105-a, may implement an MPE based RACH selection procedure.

In some examples, a UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS, SSS, and the like) using multiple beams in a beam-sweeping manner through a cell coverage area. In some cases, PSS, or SSS, or broadcast information (e.g., a physical broadcast channel (PBCH)), or any combination thereof, may be transmitted within different SSBs on respective directional beams, where one or more SSBs may be included within an SS burst. In some examples, base station 105-a may transmit synchronization signals over wide beams 205-a and 205-b to UE 115-a.

In some examples, after receiving the PSS and SSS, the UE 115 may receive a master information block (MIB), which may be transmitted in the PBCH. The MIB may contain system bandwidth information, a system frame number (SFN), and a physical channel hybrid automatic repeat request (HARQ) indicator channel (PHICH) configuration. After decoding the MIB, the UE 115 may receive one or more system information blocks (SIBs). For example, a first SIB (SIB1) may contain cell access parameters and scheduling information for other SIBs. Decoding SIB1 may enable the UE 115 to receive a second SIB (SIB2). SIB2 may contain radio resource control (RRC) configuration information related to RACH procedures, paging, physical uplink control channels (PUCCHs), physical uplink shared channels (PUSCHs), power control, sounding reference signals (SRSs), and cell barring.

In some examples, after completing initial cell synchronization, a UE 115 may decode the MIB, SIB1 and SIB2 prior to accessing the network. In some examples, after the UE 115 decodes the MIB, SIB1, and SIB2, the UE 115 may transmit a RACH preamble to a base station 105 (e.g., a first step or message for a four-step RACH, such as a RACH message 1). For example, the RACH preamble may be randomly selected from a set of 64 predetermined sequences. This random selection may enable the base station 105 to distinguish between multiple UEs 115 trying to access the system simultaneously. The base station 105 may respond with a random access response that provides an uplink resource grant, a timing advance, and a temporary C-RNTI (e.g., a second step or message for the four-step RACH, such as a RACH message 2). The UE 115 may then transmit an RRC connection request along with a temporary mobile subscriber identity (TMSI) (e.g., when the UE 115 has previously been connected to the same wireless network) or a random identifier (e.g., a third step or message for the four-step RACH, such as a RACH message 3). The RRC connection request may also indicate the reason the UE 115 is connecting to the network (e.g., emergency, signaling, data exchange, etc.). The base station 105 may respond to the connection request with a contention resolution message addressed to the UE 115 (e.g., a fourth step or message for the four-step RACH, such as a RACH message 4), which may provide a new C-RNTI. If the UE 115 receives a contention resolution message with the correct identification, the UE 115 may proceed with RRC setup. If the UE 115 does not receive a contention resolution message (e.g., if there is a conflict with another UE 115), the UE 115 may repeat the RACH process by transmitting a new RACH preamble. Such exchange of messages between the UE 115 and base station 105 for random access may be referred to as a four-step RACH procedure.

In other examples, a two-step RACH procedure may be performed for random access. For instance, wireless devices operating in licensed or unlicensed spectrum within wireless communications system 100 may participate in a two-step RACH procedure to reduce delay in establishing communication with a base station 105 (e.g., as compared to a four-step RACH procedure). Additionally, the two-step RACH procedure may be applicable to any cell size, may work regardless of whether the RACH procedure is contention-based or contention-free, and may combine multiple RACH messages from a four-step RACH procedure.

In one example, a first RACH message (e.g., message A) of the two-step RACH procedure, sent from a UE 115 to a base station 105, may combine the contents of a RACH message 1 and RACH message 3 from the four-step RACH procedure. Additionally, message A may include a RACH preamble and a PUSCH carrying a payload with the contents of the message (e.g., equivalent to RACH message 3), where the preamble and the payload may be transmitted on separate waveforms. In some cases, the base station 105 may transmit a downlink control channel (e.g., physical downlink control channel (PDCCH)) and a corresponding second RACH message (e.g., message B) of the two-step RACH procedure to the UE 115, where message B may combine the equivalent contents of a RACH message 2 and RACH message 4 from the four-step RACH procedure. In some examples of two-step RACH procedures, a base station 105 may transmit message B using either broadcast methods (e.g., targeting multiple UEs 115) or unicast methods (e.g., targeting a specific UE 115).

In some cases, UE 115-*a* and base station 105-*a* may perform the two-step RACH procedure and four-step RACH procedure over wide beams 205-*a* and 205-*b* and beams 210-*a*, 210-*b*, and 210-*c*. In some implementations, UE 115-*a* may be configured to select between the two-step RACH procedure and the four-step RACH procedure. UE 115-*a* may be configured with a RACH procedure selection rule. The RACH procedure selection rule may include one or more SSB-based RSRP thresholds such that UE 115-*a* may compare the SSB-based RSRP calculated from wide beam 205-*a*, or wide beam 205-*b*, or both to the configured thresholds. An SSB-based RSRP calculation may indicate a channel quality between the base station 105-*a* and UE 115-*a* and a channel quality between UE 115-*a* and base station 105-*a*. For example, a higher SSB-based RSRP measurement or calculation ay correspond to a higher channel quality. If the calculated SSB-based RSRP is above the threshold, UE 115-*a* may be configured to select the two-step RACH procedure because the channel quality between base station 105-*a* and UE 115-*a* is good. If the calculated SSB-based RSRP is below the threshold, UE 115-*a* may be configured to select the four-step RACH procedure because the four-step RACH may be more reliable than the two-step RACH. In some cases, UE 115-*a* may be configured with one or more thresholds, and UE 115-*a* may select which threshold to use based on whether MPE conditions are present.

For example, UE 115-*a* may include one or more antenna panels 215 and a user may be in close proximity to one or more of the antenna panels 215. For example, the user may hold UE 115-*a* such that the user is holding UE 115-*a* at or near a location of an antenna panel 215. In such cases, the UE 115-*a* may be configured with an MPE restriction such that when UE 115-*a* detects body proximity near one or more antenna panels 215, UE 115-*a* may restrict the power of the transmissions from one or more of the antenna panels 215. As such, to increase reliability in the network, UE 115-*a* may be configured to consider MPE conditions prior to selecting a RACH procedure because selecting a RACH procedure based on an SSB-based RSRP without considering transmission power may result in an inaccurate RACH procedure selection. UE 115-*a* may be configured with one or multiple SSB-based RSRP thresholds. UE 115-*a* may use a first threshold when MPE conditions apply, and may use a second threshold when MPE conditions do not apply. In some cases, the first threshold may be higher than the second threshold to account for lower transmission powers at which UE 115-*a* is transmitting.

Figure 3A:
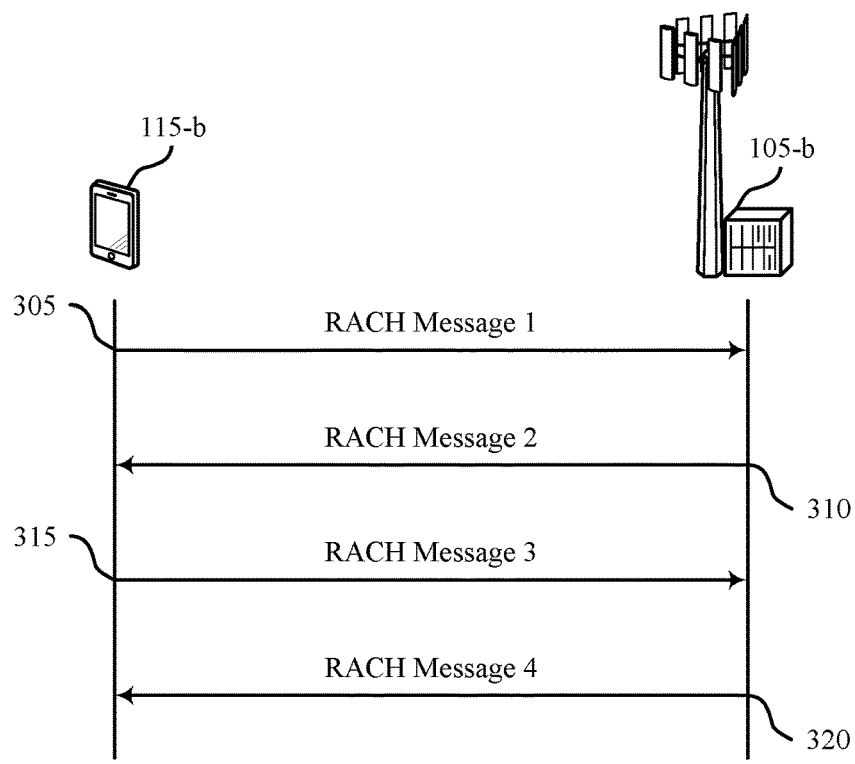
FIGS. 3A and 3B illustrate examples of a four-step RACH procedure and a two-step RACH procedure, respectively, in accordance with aspects of the present disclosure.

FIG. 3A illustrates an example of a four-step RACH procedure 300 in accordance with aspects of the present disclosure. The four-step RACH procedure 300 may illustrate an example four-step RACH procedure selected based on MPE. For example, UE 115-*b* may select the four-step RACH procedure based on MPE, and UE 115-*b* and base station 105-*b* may perform the four-step RACH procedure. Base station 105-*b* and UE 115-*b* may be examples of corresponding wireless devices described with reference to FIGS. 1 and 2. In some cases, instead of UE 115-*b* selecting the RACH procedure, a different type of wireless device (e.g., a base station 105) may perform the MPE based selection. Alternative examples of the following may be implemented, where some steps are performed in a different order than described or are not performed at all. In some cases, steps may include additional features not mentioned below, or further steps may be added.

UE 115-*b* may identify a RACH procedure selection rule for selecting between a two-step and four-step RACH procedure. In some cases, the rule may include one or more SSB-based RSRP thresholds. In some implementations, UE 115-*b* may be configured with two thresholds, where one threshold may be used when MPE restrictions apply, and the other threshold may be used when MPE restrictions do not apply. UE 115-*b* may determine whether an MPE restriction applies based on whether UE 115-*b* is in contact with an object, such as a body. Based on whether MPE restrictions apply, UE 115-*b* may select the appropriate SSB-based RSRP threshold. If the RSRP measured by UE 115-*b* is below the selected threshold, UE 115-*b* may select the four-step RACH procedure.

A communication link may be established between UE 115-*b* and base station 105-*b* by a four-step RACH procedure. In such cases, as part of the four-step RACH procedure, UE 115-*b* may transmit at least two RACH messages (e.g., RACH message 1 and RACH message 3) and base station 105-*b* may transmit at least two RACH messages (e.g., RACH message 2 and RACH message 4).

At 305, UE 115-*b* may initiate a RACH procedure by transmitting a RACH message 1 (e.g., msg 1). In some cases, RACH message 1 may include a RACH preamble. In one example, the RACH preamble may carry a random access radio network temporary identifier (RA-RNTI). As shown, UE 115-*b* may transmit RACH message 1 to base station 105-*b*.

Upon receiving RACH message 1, base station 105-*b* may decode RACH message 1 (e.g., a RACH preamble) and may obtain the RA-RNTI. In some cases, the RA-RNTI may be calculated from a resource used to transmit the RACH preamble. For instance, base station 105-*b* may utilize the time and frequency allocation of the preamble resource to calculate the RA-RNTI.

At 310, base station 105-*b* may transmit a RACH message 2 (e.g., msg 2). RACH message 2 may include a RACH preamble response. The RACH preamble response may include information for UE 115-*b*. For example, the RACH preamble response may include an uplink grant to UE 115-*b*, a temporary cell radio network temporary identifier (TC-RNTI), a resource block (RB) assignment, a modulation coding scheme (MCS) configuration, and the like. Additionally, base station 105-*b* may configure itself to receive a RACH message 3 (e.g., msg 3) using the information included in RACH message 2.

UE 115-*b* may receive RACH message 2 and may decode RACH message 2 (e.g., RACH preamble response, random access response, etc.) and obtain the information included in the RACH message 2. The included information may enable UE 115-*b* to transmit RACH message 3 at 315. For instance, UE 115-*b* may utilize the received TC-RNTI and uplink grant to transmit a corresponding RACH message 3. RACH message 3 may include an RRC connection request.

Base station 105-*b* may receive RACH message 3 and decode RACH message 3 to generate a RACH message 4 (e.g., msg 4) using the received information (e.g., RRC connection request). At 320, base station 105-*b* may transmit RACH message 4 that may include an RRC connection setup corresponding to UE 115-*b* (e.g., the RRC connection setup may be associated with a TC-RNTI of UE 115-*a*). RACH message 4 may also include a cell radio network temporary identifier (CRNTI) for future communication with UE 115-*b*. For instance, after RACH message 4, UE 115-*b* and base station 105-*b* may communicate using the CRNTI.

Figure 3B:
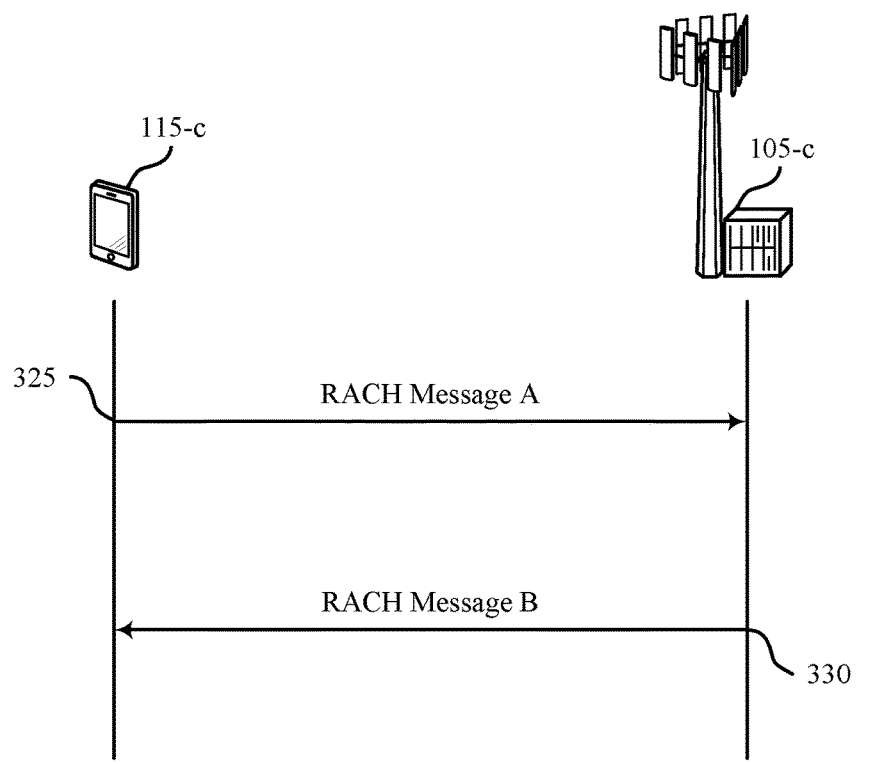

FIG. 3B illustrates an example of a two-step RACH procedure 301 in accordance with aspects of the present disclosure. The two-step RACH procedure 301 may illustrate an example two-step RACH procedure selected based on MPE. For example, a UE 115-*c* may select the two-step RACH procedure based on MPE, and UE 115-*c* and a base station 105-*c* may perform the two-step RACH procedure. Base station 105-*c* and UE 115-*c* may be examples of corresponding wireless devices described with reference to FIGS. 1 through 3. In some cases, instead of UE 115-*c* selecting the RACH procedure, a different type of wireless device (e.g., a base station 105) may perform the MPE based selection. Alternative examples of the following may be implemented, where some steps are performed in a different order than described or are not performed at all. In some cases, steps may include additional features not mentioned below, or further steps may be added.

UE 115-*c* may identify a RACH procedure selection rule for selecting between a two-step and four-step RACH procedure. In some cases, the rule may include one or more SSB-based RSRP thresholds. In some implementations, UE 115-*c* may be configured with two thresholds, where one threshold may be used when MPE restrictions apply, and the other threshold may be used when MPE restrictions do not apply. UE 115-*c* may determine whether an MPE restriction applies based on whether UE 115-*c* is in contact with an object, such as a part of the human body (e.g., part of a user's hand or other body part). Based on whether MPE restrictions apply, UE 115-*c* may select the appropriate SSB-based RSRP threshold. If the RSRP measured by UE 115-*c* is above the selected threshold, UE 115-*c* may select the two-step RACH procedure.

A communication link may be established between UE 115-*c* and base station 105-*c* by a two-step RACH procedure. In such cases, as part of the two-step RACH procedure, UE 115-*c* may transmit a first RACH message (e.g., RACH message A) and base station 105-*c* may transmit a second RACH message (e.g., RACH message B).

In one example, a first RACH message (e.g., RACH message A), sent from UE 115-*c* to base station 105-*c*, may combine the contents of a RACH message 1 and message 3 from a four-step RACH procedure (e.g., the four-step RACH procedure of FIG. 3A). In some cases, RACH message A may include a RACH preamble (e.g., RACH message 1 transmitted at 305 in the example of FIG. 3A) and a PUSCH carrying a payload with the contents of the message (e.g., RACH message 3 transmitted at 315 in the example of FIG. 3A). In some cases, the preamble and the payload of RACH message A may be transmitted on separate waveforms.

In some cases, base station 105-*c* may transmit a downlink control channel (e.g., PDCCH) and a corresponding second RACH message (e.g., RACH message B) to UE 115-*c*, where RACH message B may combine the equivalent contents of a RACH message 2 and message 4 from four-step RACH (e.g., RACH message 2 received at 310 and RACH message 4 received at 320 in the example of FIG. 3A). In some examples of two-step RACH, base station 105-*c* may transmit RACH message B using either broadcast methods (e.g., targeting multiple UEs including UE 115-*c*) or unicast methods (e.g., targeting one or more specific UEs such as at least UE 115-*c*).

At 325, UE 115-*c* may initiate a RACH procedure and transmit RACH message A to base station 105-*c*. As indicated, RACH message A may include a preamble portion (e.g., a RACH preamble as described in FIG. 3A) and a payload portion (e.g., PUSCH payload).

In some cases, base station 105-*c* may receive RACH message A and subsequently transmit RACH message B at 330. RACH message B may include multiple portions or information, or both. For example, RACH message B may include a preamble response portion, a contention resolution portion, an RRC connection setup message, or a combination thereof. The second message may also include other information provided by base station 105-*c* to UE 115-*c*, such as timing advance information.

Figure 4:
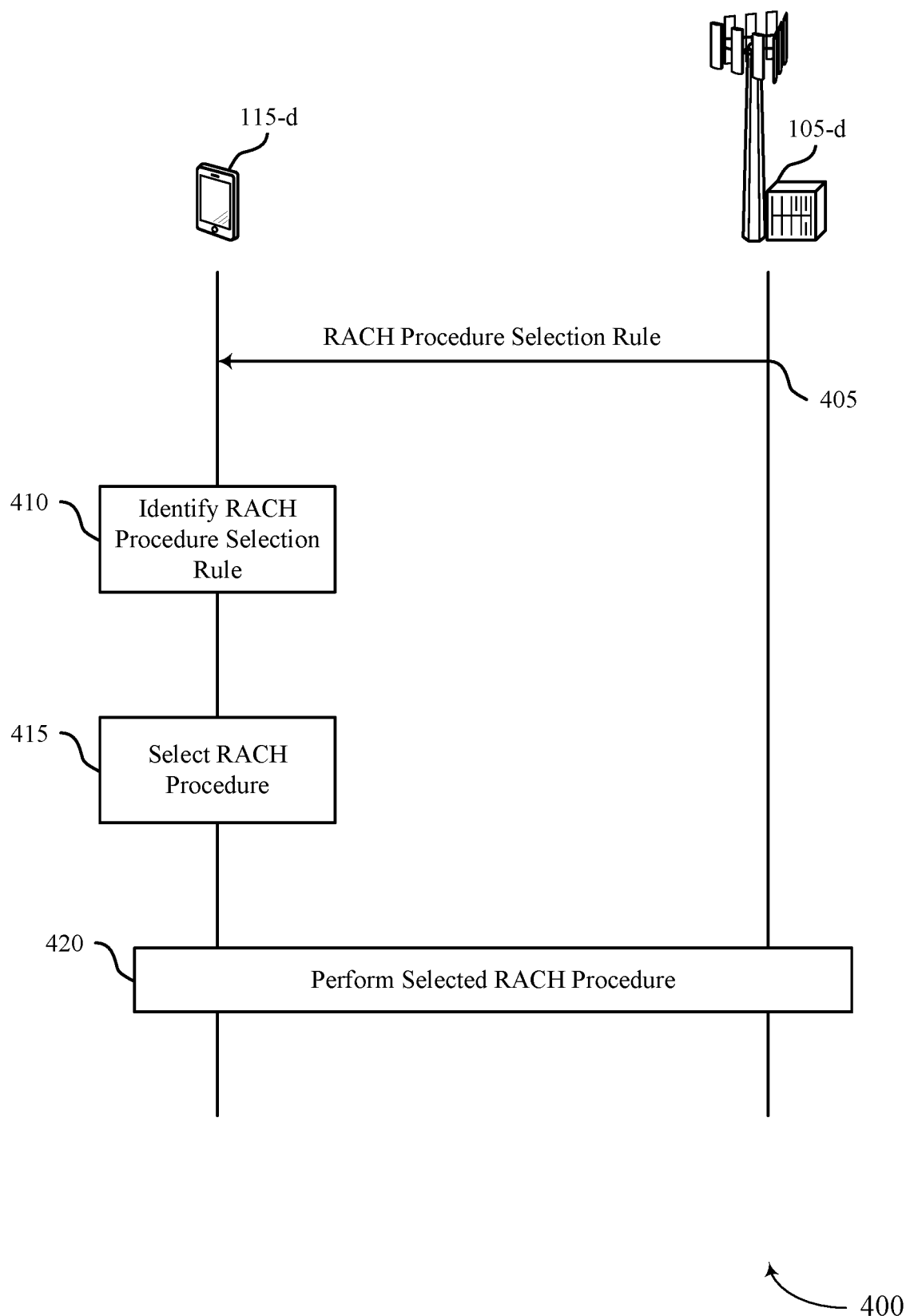
FIG. 4 illustrates an example of a process flow in accordance with aspects of the present disclosure.

FIG. 4 illustrates an example of a process flow 400 in accordance with aspects of the present disclosure. The process flow 400 may illustrate an example beam-sweeping scheme for gaining access to a channel. For example, a UE 115-*d* may perform a RACH procedure selection based on MPE conditions and may perform a RACH procedure with a base station 105-*d* based on the selection. Base station 105-*d* and UE 115-*d* may be examples of corresponding wireless devices described with reference to FIGS. 1 through 3B. In some cases, instead of UE 115-*d* performing the RACH selection procedure, a different type of wireless device (e.g., a base station 105) may perform the selection. Alternative examples of the following may be implemented, where some steps are performed in a different order than described or are not performed at all. In some cases, steps may include additional features not mentioned below, or further steps may be added.

At 405, base station 105-*d* may transmit, to UE 115-*d*, control signaling indicating a RACH procedure selection rule for selecting between a first RACH procedure and a second RACH procedure based on whether an exposure condition is identified. In some cases, base station 105-*d* may transmit control signaling, such as remaining minimum system information (RMSI), that indicates the RACH procedure selection rule to configure UE 115-*d* with the RACH procedure selection rule. In some cases, the first RACH procedure may refer to a two-step RACH procedure, and the second RACH procedure may refer to a four-step RACH procedure, or vice versa. In some cases, an exposure condition may refer to an MPE restriction.

At 410, UE 115-*d* may identify a RACH procedure selection rule for selecting between a first RACH procedure and a second RACH procedure based on whether an exposure condition is identified. In some cases, UE 115-*d* may be preconfigured with the RACH procedure selection rule or may receive control signaling that indicates the RACH procedure selection rule (e.g., such as the control signaling received at 405). In some cases, the RACH procedure selection rule indicates a threshold for selecting between the first RACH procedure and the second RACH procedure when the exposure condition is or is not identified. In some cases, UE 115-*d* may determine a second threshold based on the threshold indicated by base station 105-*d*. In some cases, the RACH procedure selection rule indicates a first threshold for selecting between the first RACH procedure and the second RACH procedure when the exposure condition is identified and a second threshold for selecting between the first RACH procedure and the second RACH procedure when the exposure condition is not identified.

For example, UE 115-*d* may be configured to select between a four-step RACH and two-step RACH procedure based fully or partially on an MPE condition of UE 115-*d*. In some implementations, selecting the RACH procedure based fully on the MPE condition may refer to the UE 115-*d* selecting the procedure solely based on the MPE condition. In some implementations, UE 115-*d* may base the selection partially on the MPE condition and may use other measurements (e.g., SSB-based RSRP) in combination with MPE related measurements to select a RACH procedure. UE 115-*d* may be configured with one or more thresholds and may select the RACH procedure based on the thresholds. In some cases, the one or more thresholds may each be SSB-based RSRP thresholds. In some cases, one of the thresholds may apply and be used by UE 115-*d* when MPE conditions do not apply, and another threshold may apply and be used by UE 115-*d* when MPE conditions do apply, such as when there is body proximity for a UE 115 transmission panel and/or in the direction of the UE 115 beam (e.g., beam 210-*a*, 210-*b*, 210-*c*).

An SSB-based RSRP measurement may indicate the strength of a channel between UE 115-*d* and base station 105-*d*. If MPE conditions do not apply, UE 115-*d* may transmit at full power, or up to full power, over the channel. In the case where UE 115-*d* detects an MPE restriction, the UE 115-*d* may transmit to base station 105-*d* at a lower power to comply with the MPE restriction. As such, the threshold that applies to the MPE case may be a higher value than the threshold that applies to the non-MPE case because the channel quality may need to be greater to account for UE 115-*d* transmitting at lower power.

As described herein, in some cases, both thresholds may be configured by base station 105-*d*. For example, base station 105-*d* may indicate a value of a first threshold and the value of a second threshold to UE 115-*d*. In some cases, base station 105-*d* may configure one of the thresholds, and UE 115-*d* may determine the second threshold based on the first threshold. For example, base station 105-*d* may configure threshold one (e.g., TH1) as an SSB-based RSRP limit. In some cases, the configured threshold may apply to the case where an MPE condition applies. In some other cases, the one threshold may apply to the case where an MPE condition does not apply. Base station 105-*d* may indicate for which case the threshold applies, or UE 115-*d* may be preconfigured with this information. If the first threshold applies to the case where an MPE condition applies, then UE 115-*d* may determine the threshold for the case where an MPE condition does not apply. UE 115-*d* may determine a second SSB-based RSRP limit for non-MPE condition threshold 2 (e.g., TH2) by subtracting a value, x, from MPE condition threshold one (e.g., TH2=TH1−x, where x is a positive integer) because the threshold that applies to the MPE condition is higher than the threshold that applies to the non-MPE condition. If the first threshold is applicable to the case where an MPE condition does not apply, then UE 115-*d* may determine the threshold for the case where an MPE condition does apply. In such a case, UE 115-*d* may determine a second SSB-based RSRP limit for an MPE condition threshold 2 (e.g., TH2) by adding a value, x, to MPE condition threshold one (e.g., TH2=TH1+x, where x is a positive integer) because the threshold that applies to the MPE condition should be higher than the threshold that applies to the non-MPE condition.

In some cases, UE 115-*d* may be preconfigured with a fixed value of x, or base station 105-*d* may signal the value of x to UE 115-*d* dynamically, semi-statically, or aperiodically. In some cases, threshold TH1 and threshold TH2 may be based on a frequency band being used for communications between UE 115-*d* and base station 105-*d*. For example, the value of x may change depending on which frequency band is being used. UE 115-*d* may be preconfigured with a mapping between x values and frequency bands, or base station 105-*d* may transmit the mapping or indicate a specific relationship between x and frequency bands to UE 115-*d*.

At 415, UE 115-*d* may select between the first RACH procedure and the second RACH procedure based on the RACH procedure selection rule. For example, using either threshold, UE 115-*d* may select the two-step RACH procedure if the SSB-based RSRP value calculated by UE 115-*d* is above the threshold, and UE 115-*d* may select the four-step RACH procedure of the SSB-based RSRP value calculated by UE 115-*d* is below the threshold.

At 420, UE 115-*d* may perform the selected RACH procedure based on the selecting. For example, UE 115-*d* and base station 105-*d* may perform a four-step RACH procedure as described with reference to FIG. 3A, or UE 115-*d* and base station 105-*d* may perform a two-step RACH procedure as described with reference to FIG. 3B.

Figure 5:
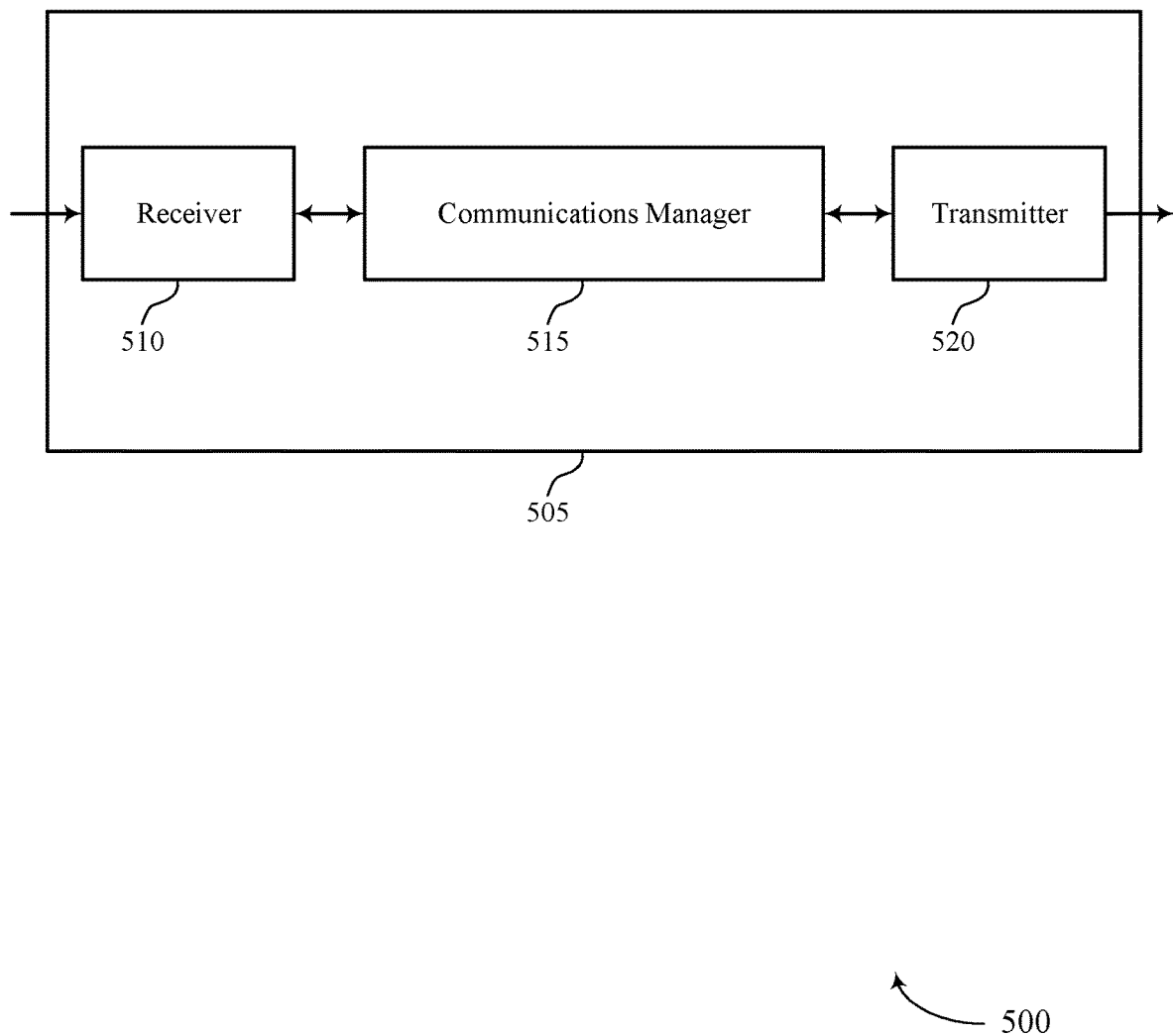
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to exposure-dependent RACH procedure selection, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a RACH procedure selection rule for selecting between a two-step RACH procedure and a four-step RACH procedure based on whether an exposure condition is identified. In some examples, the communications manager 515 may select between the two-step RACH procedure and the four-step RACH procedure based on the RACH procedure selection rule. Additionally, the communications manager 515 may perform the selected RACH procedure based on the selecting. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The communications manager 515 as described herein may be implemented to realize one or more potential advantages. One implementation may allow the device 505 to more accurately select a RACH procedure. For example, a device 505 may select between a two-step and four-step RACH procedure based on the current transmission power of the UE and the channel quality between device 505 and a base station.

Based on implementing the RACH selection techniques as described herein, a processor of a UE 115 (e.g., controlling the receiver 510, the transmitter 520, or the transceiver 820 as described with reference to FIG. 8) may increase reliability and efficiency in the selection and performance of a RACH procedure between a UE 115 and a base station.

Figure 6:
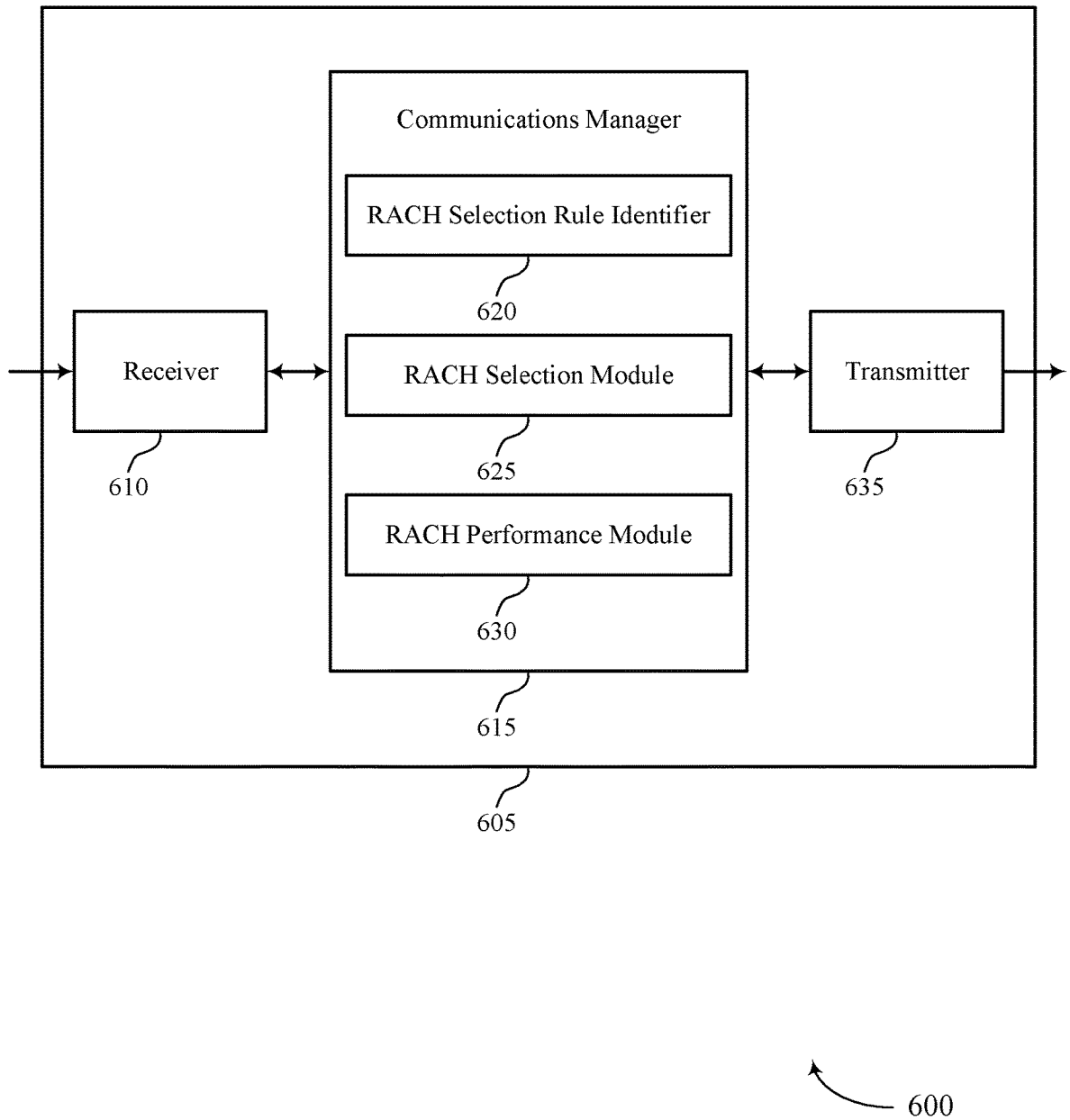

FIG. 6 shows a block diagram 600 of a device 605 in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to exposure-dependent RACH procedure selection, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a RACH selection rule identifier 620, a RACH selection module 625, and a RACH performance module 630. The communications manager 615 may be an example of aspects of the communications manager 810 described herein.

The RACH selection rule identifier 620 may identify a RACH procedure selection rule for selecting between a two-step RACH procedure and a four-step RACH procedure based on whether an exposure condition is identified. The RACH selection module 625 may select between the two-step RACH procedure and the four-step RACH procedure based on the RACH procedure selection rule. The RACH performance module 630 may perform the selected RACH procedure based on the selecting.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
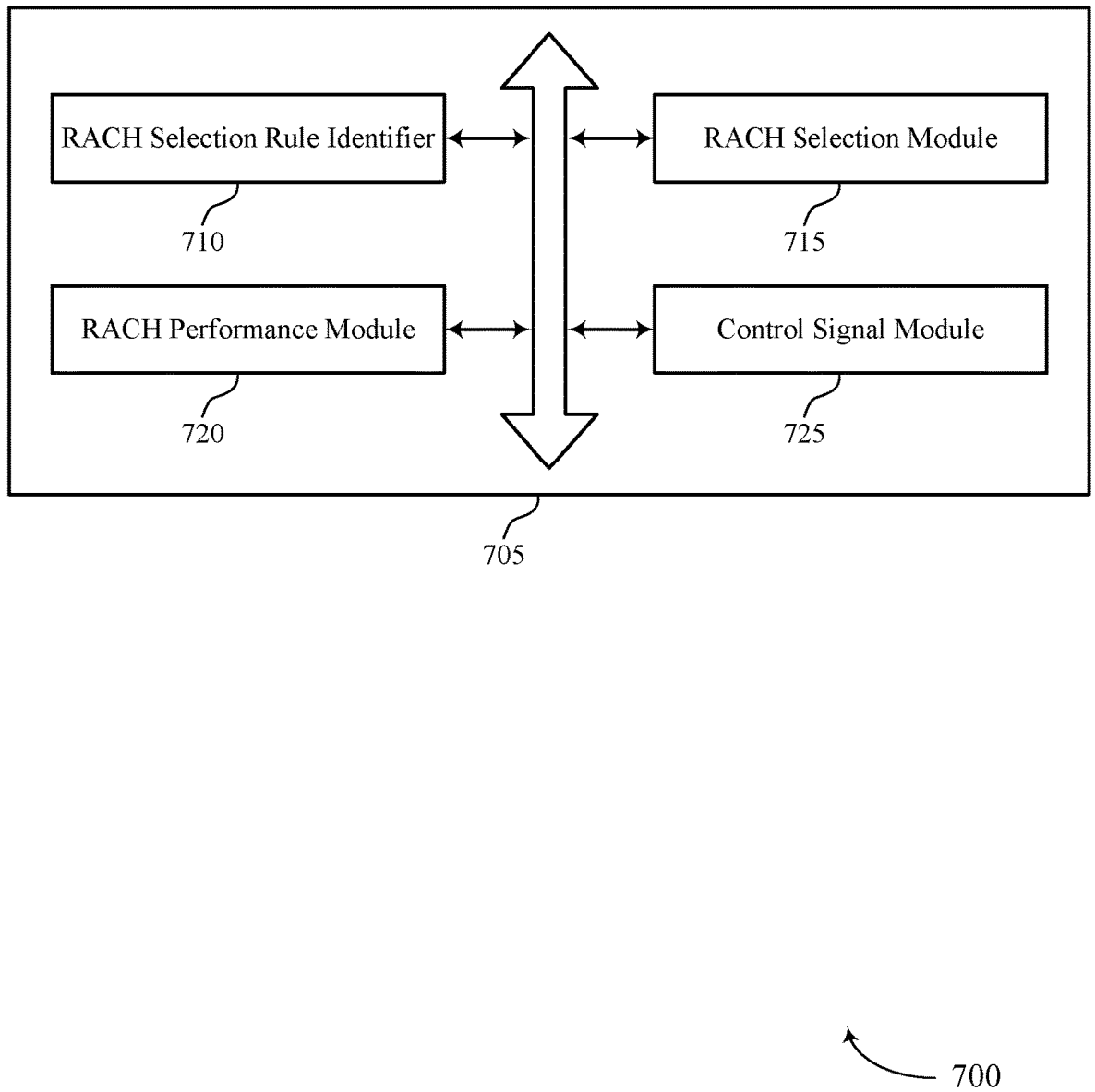
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include a RACH selection rule identifier 710, a RACH selection module 715, a RACH performance module 720, and a control signal module 725. Each of these modules may communicate, directly or indirectly, with one another (e.g., via one or more buses).

The RACH selection rule identifier 710 may identify a RACH procedure selection rule for selecting between a two-step RACH procedure and a four-step RACH procedure based on whether an exposure condition is identified. The RACH selection module 715 may select between the two-step RACH procedure and the four-step RACH procedure based on the RACH procedure selection rule. The RACH performance module 720 may perform the selected RACH procedure based on the selecting.

In some examples, the RACH selection rule identifier 710 may identify the RACH procedure selection rule that indicates a threshold for selecting between the two-step RACH procedure and the four-step RACH procedure when the exposure condition is or is not identified. In some examples, the RACH selection rule identifier 710 may identify the RACH procedure selection rule that indicates a first threshold for selecting between the two-step RACH procedure and the four-step RACH procedure when the exposure condition is identified and a second threshold for selecting between the two-step RACH procedure and the four-step RACH procedure when the exposure condition is not identified.

In some examples, the RACH selection rule identifier 710 may identify the second threshold based on the first threshold. In some examples, the RACH selection rule identifier 710 may identify the first threshold based on the second threshold.

In some examples, the RACH selection rule identifier 710 may identify the RACH procedure selection rule that indicates a first frequency band in which to apply the first and second thresholds. In some examples, the RACH selection rule identifier 710 may identify the RACH procedure selection rule that indicates a second frequency band in which to apply at least a third threshold for selecting between the two-step RACH procedure and the four-step RACH procedure.

The control signal module 725 may receive control signaling that indicates the RACH procedure selection rule. In some examples, the control signal module 725 may receive control signaling that includes system information that indicates the RACH procedure selection rule. In some examples, the control signal module 725 may receive control signaling that indicates the RACH procedure selection rule that indicates the first threshold, the second threshold, or both. In some examples, the control signal module 725 may receive control signaling that indicates the RACH procedure selection rule that indicates the first threshold. In some examples, the control signal module 725 may receive control signaling that indicates the RACH procedure selection rule that indicates the second threshold.

Figure 8:
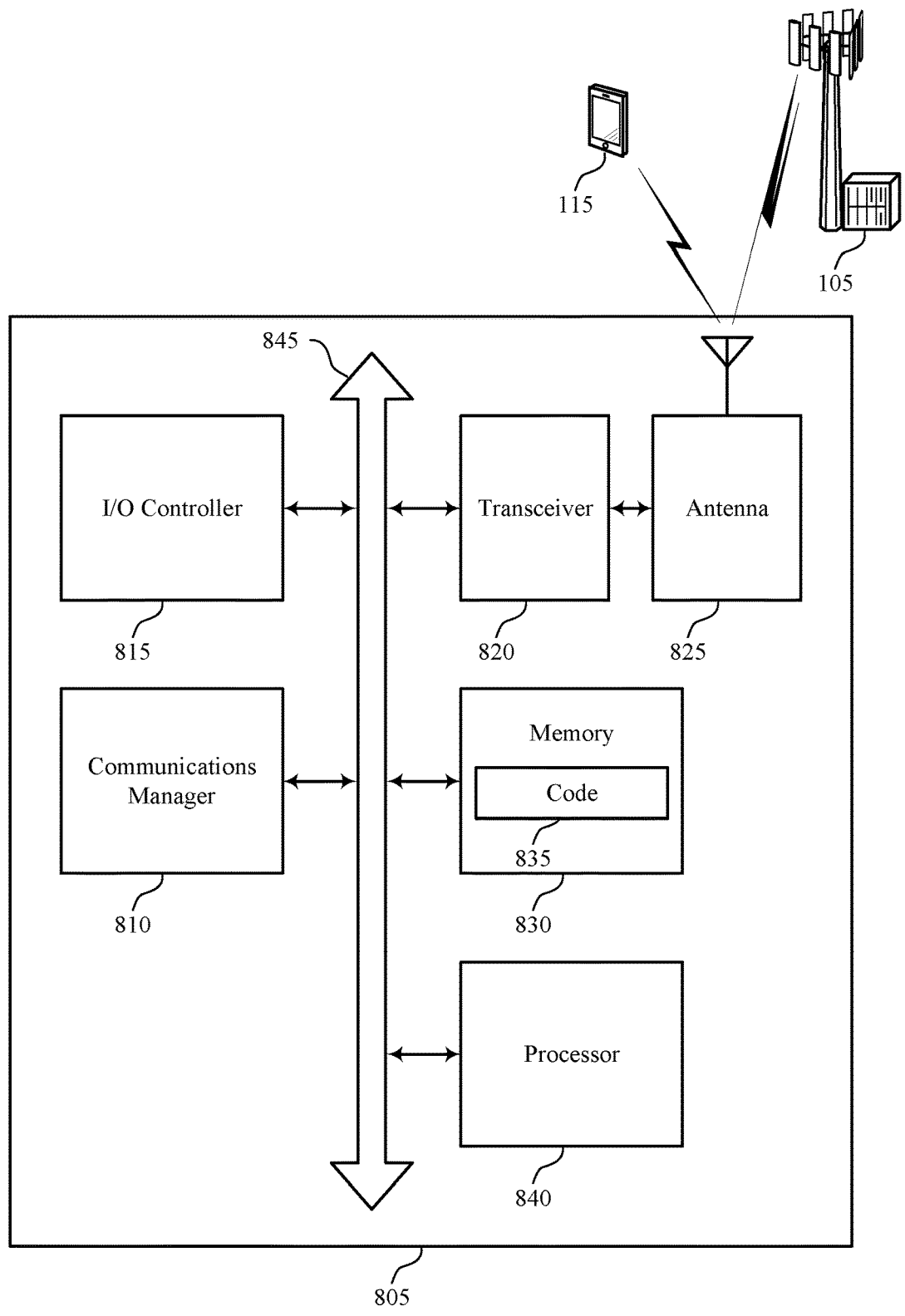
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a RACH procedure selection rule for selecting between a two-step RACH procedure and a four-step RACH procedure based on whether an exposure condition is identified. In some examples, the communications manager 810 may select between the two-step RACH procedure and the four-step RACH procedure based on the RACH procedure selection rule. Additionally, the communications manager 810 may perform the selected RACH procedure based on the selecting.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting exposure-dependent RACH procedure selection).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
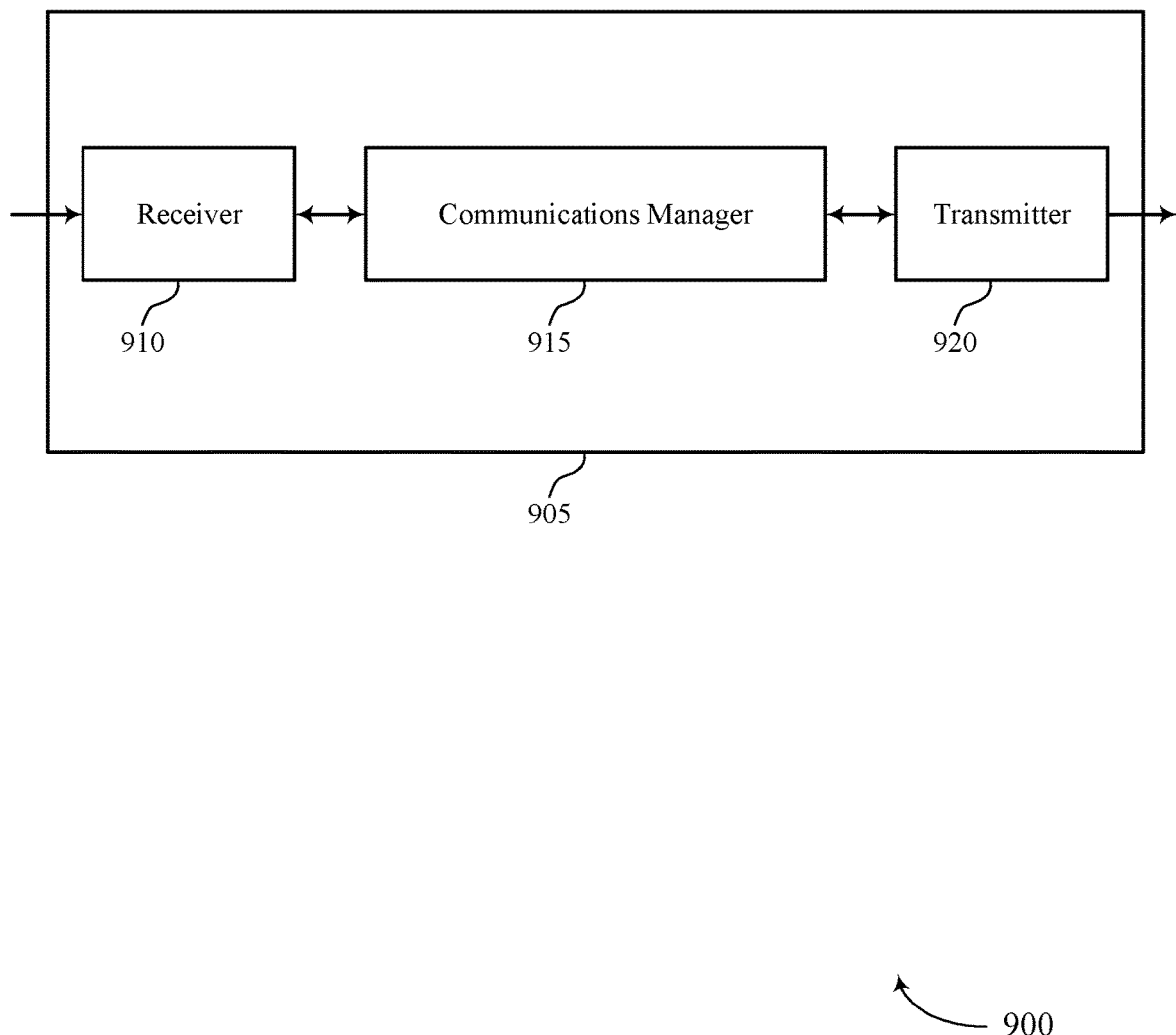
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to exposure-dependent RACH procedure selection, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, control signaling indicating a RACH procedure selection rule for selecting between a two-step RACH procedure and a four-step RACH procedure based on whether an exposure condition is identified. Additionally, the communications manager 915 may perform one of the two-step RACH procedure or the four-step RACH procedure with the UE based on the RACH procedure selection rule. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
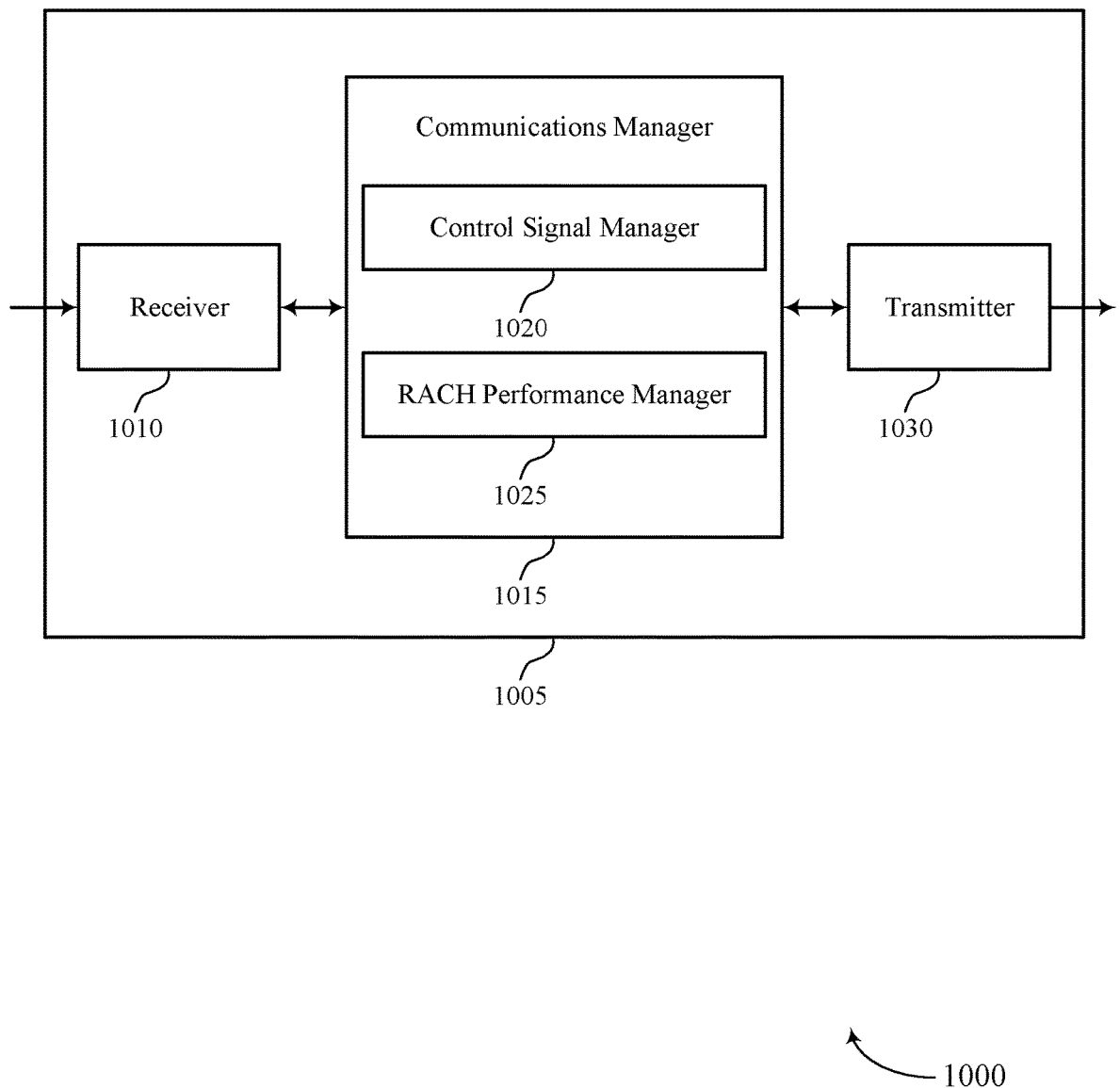

FIG. 10 shows a block diagram 1000 of a device 1005 in in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to exposure-dependent RACH procedure selection, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control signal manager 1020 and a RACH performance manager 1025. The communications manager 1015 may be an example of aspects of the communications manager 1210 described herein.

The control signal manager 1020 may transmit, to a UE, control signaling indicating a RACH procedure selection rule for selecting between a two-step RACH procedure and a four-step RACH procedure based on whether an exposure condition is identified. The RACH performance manager 1025 may perform one of the two-step RACH procedure or the four-step RACH procedure with the UE based on the RACH procedure selection rule.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
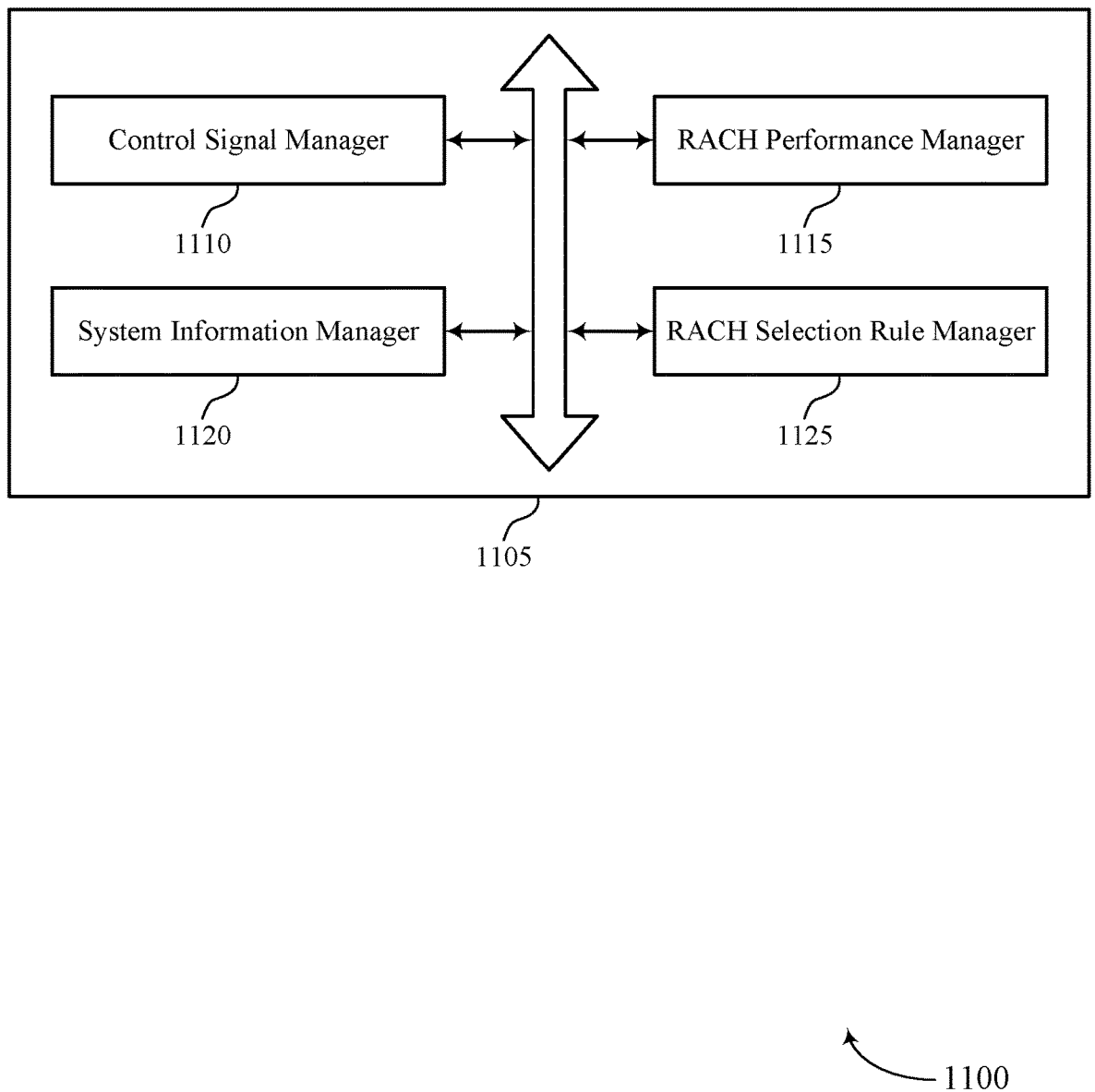
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include a control signal manager 1110, a RACH performance manager 1115, a system information manager 1120, and a RACH selection rule manager 1125. Each of these modules may communicate, directly or indirectly, with one another (e.g., via one or more buses).

The control signal manager 1110 may transmit, to a UE, control signaling indicating a RACH procedure selection rule for selecting between a two-step RACH procedure and a four-step RACH procedure based on whether an exposure condition is identified. The RACH performance manager 1115 may perform one of the two-step RACH procedure or the four-step RACH procedure with the UE based on the RACH procedure selection rule.

The system information manager 1120 may transmit the control signaling that includes system information that indicates the RACH procedure selection rule.

The RACH selection rule manager 1125 may transmit the control signaling that indicates the RACH procedure selection rule that indicates a threshold for selecting between the two-step RACH procedure and the four-step RACH procedure when the exposure condition is or is not identified. In some examples, the RACH selection rule manager 1125 may transmit the control signaling that indicates the RACH procedure selection rule that indicates a first threshold for selecting between the two-step RACH procedure and the four-step RACH procedure when the exposure condition is identified and a second threshold for selecting between the two-step RACH procedure and the four-step RACH procedure when the exposure condition is not identified.

In some examples, the RACH selection rule manager 1125 may transmit the control signaling that indicates the RACH procedure selection rule that indicates a first frequency band in which to apply the first and second thresholds. In some examples, the RACH selection rule manager 1125 may transmit the control signaling that indicates the RACH procedure selection rule that indicates a second frequency band in which to apply at least a third threshold for selecting between the two-step RACH procedure and the four-step RACH procedure. In some examples, the RACH selection rule manager 1125 may transmit the control signaling that indicates the RACH procedure selection rule that indicates a first threshold, a second threshold, or both.

Figure 12:
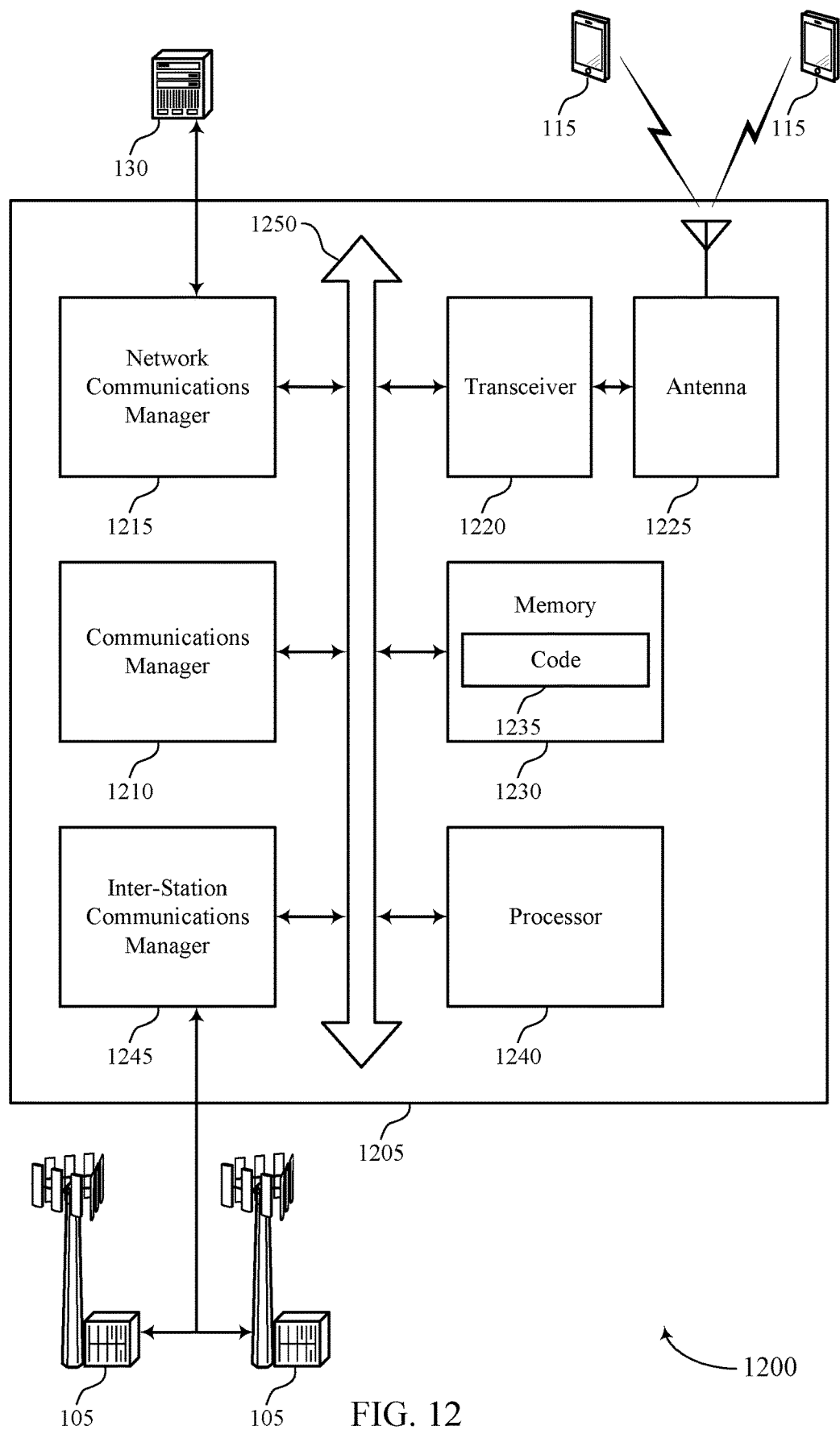
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, control signaling indicating a RACH procedure selection rule for selecting between a two-step RACH procedure and a four-step RACH procedure based on whether an exposure condition is identified. Additionally, the communications manager 1210 may perform one of the two-step RACH procedure or the four-step RACH procedure with the UE based on the RACH procedure selection rule.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting exposure-dependent RACH procedure selection).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
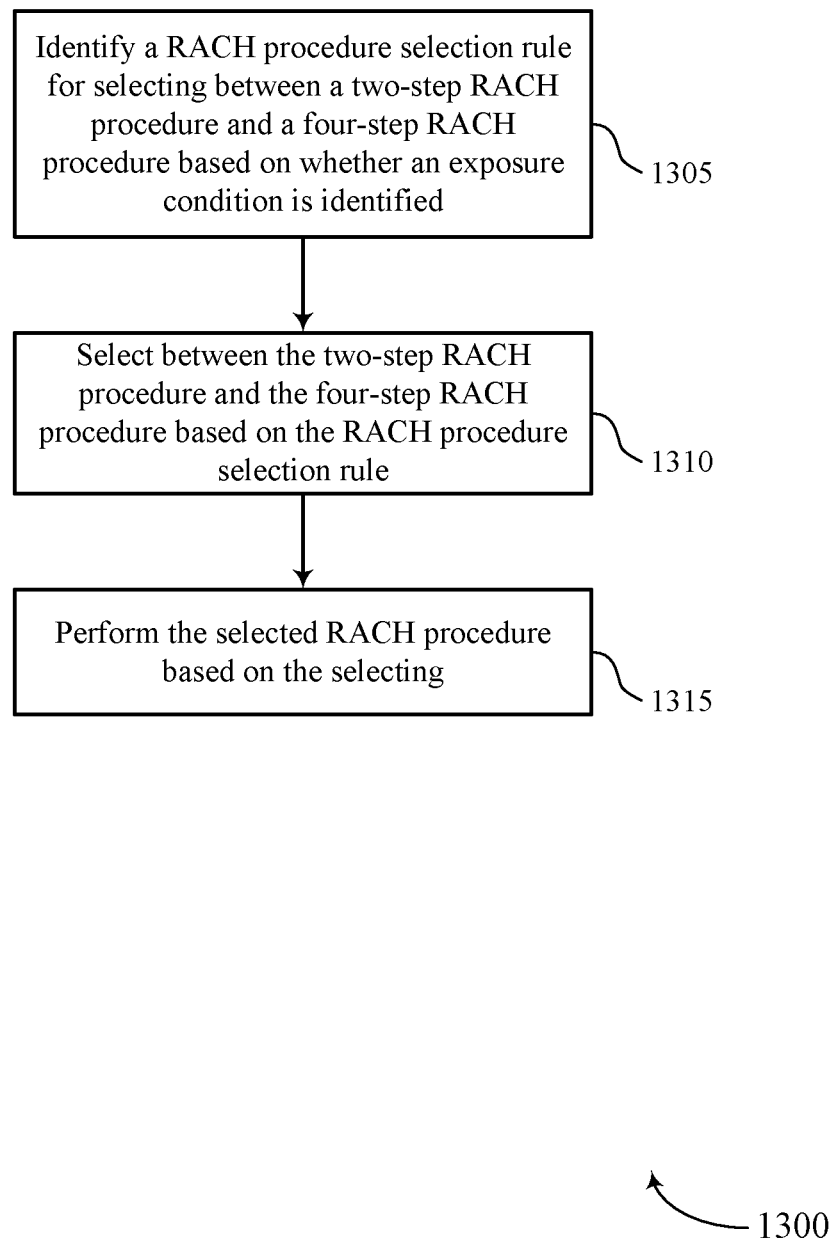
FIGS. 13 through 16 show flowcharts illustrating methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a RACH procedure selection rule for selecting between a two-step RACH procedure and a four-step RACH procedure based on whether an exposure condition is identified. The operations of 1305 may be performed according to the methods described herein. In some examples, aspects of the operations of 1305 may be performed by a RACH selection rule identifier as described with reference to FIGS. 5 through 8.

At 1310, the UE may select between the two-step RACH procedure and the four-step RACH procedure based on the RACH procedure selection rule. The operations of 1310 may be performed according to the methods described herein. In some examples, aspects of the operations of 1310 may be performed by a RACH selection module as described with reference to FIGS. 5 through 8.

At 1315, the UE may perform the selected RACH procedure based on the selecting. The operations of 1315 may be performed according to the methods described herein. In some examples, aspects of the operations of 1315 may be performed by a RACH performance module as described with reference to FIGS. 5 through 8.

Figure 14:
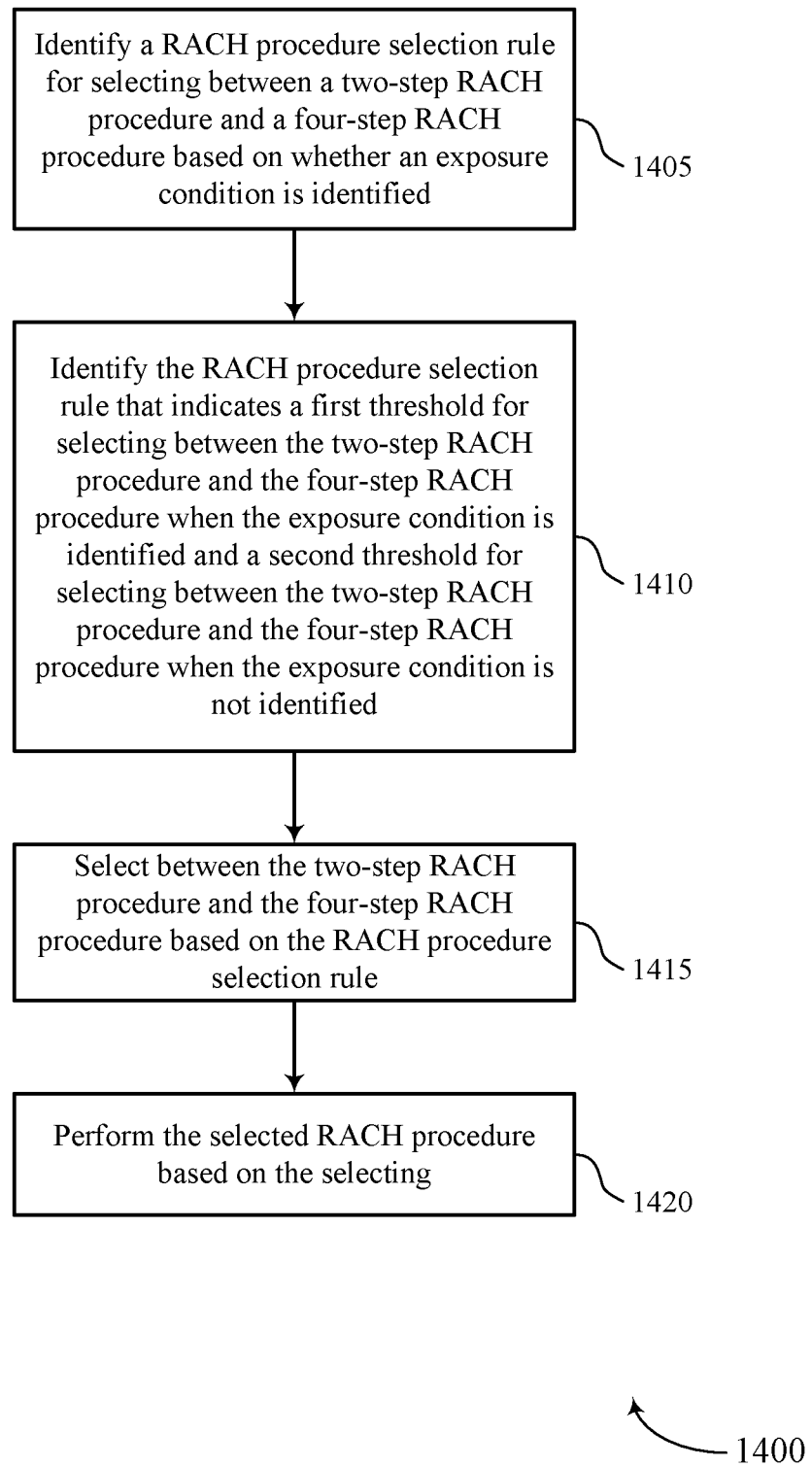

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a RACH procedure selection rule for selecting between a two-step RACH procedure and a four-step RACH procedure based on whether an exposure condition is identified. The operations of 1405 may be performed according to the methods described herein. In some examples, aspects of the operations of 1405 may be performed by a RACH selection rule identifier as described with reference to FIGS. 5 through 8.

At 1410, the UE may identify the RACH procedure selection rule that indicates a first threshold for selecting between the two-step RACH procedure and the four-step RACH procedure when the exposure condition is identified and a second threshold for selecting between the two-step RACH procedure and the four-step RACH procedure when the exposure condition is not identified. The operations of 1410 may be performed according to the methods described herein. In some examples, aspects of the operations of 1410 may be performed by a RACH selection rule identifier as described with reference to FIGS. 5 through 8.

At 1415, the UE may select between the two-step RACH procedure and the four-step RACH procedure based on the RACH procedure selection rule. The operations of 1415 may be performed according to the methods described herein. In some examples, aspects of the operations of 1415 may be performed by a RACH selection module as described with reference to FIGS. 5 through 8.

At 1420, the UE may perform the selected RACH procedure based on the selecting. The operations of 1420 may be performed according to the methods described herein. In some examples, aspects of the operations of 1420 may be performed by a RACH performance module as described with reference to FIGS. 5 through 8.

Figure 15:
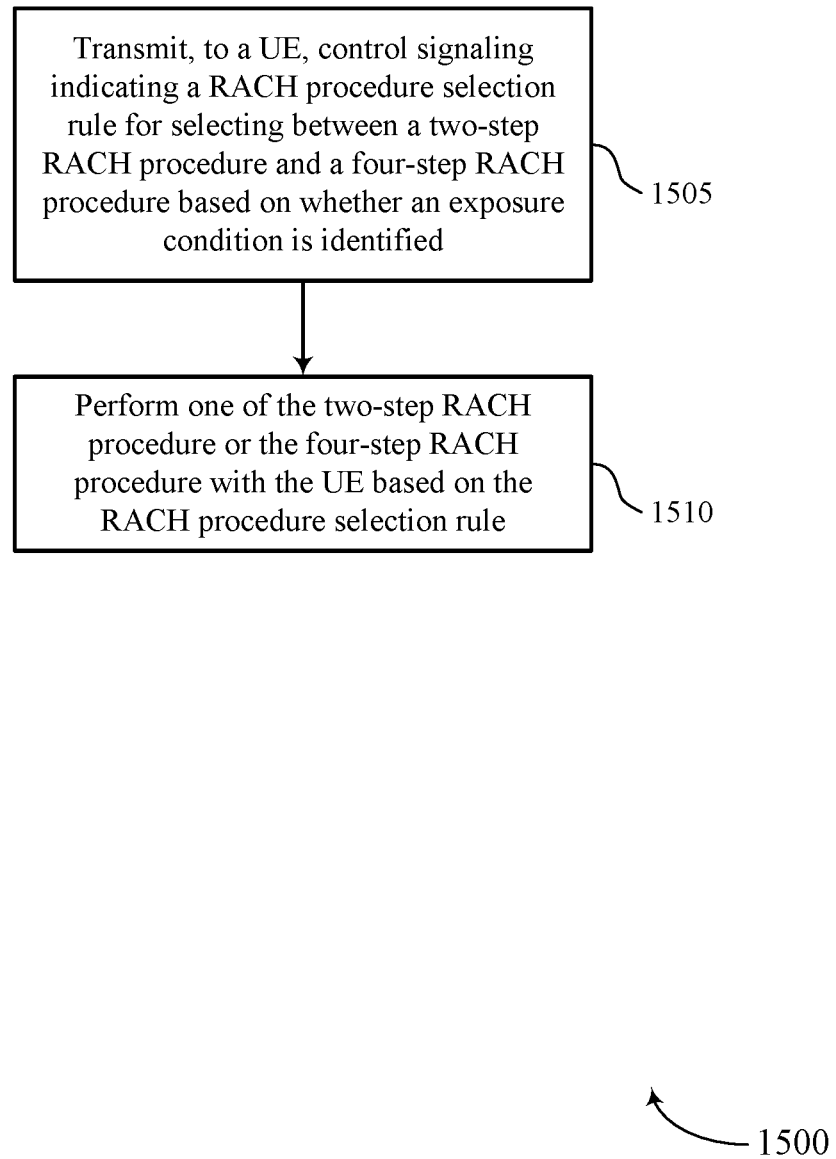

FIG. 15 shows a flowchart illustrating a method 1500 in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE, control signaling indicating a RACH procedure selection rule for selecting between a two-step RACH procedure and a four-step RACH procedure based on whether an exposure condition is identified. The operations of 1505 may be performed according to the methods described herein. In some examples, aspects of the operations of 1505 may be performed by a control signal manager as described with reference to FIGS. 9 through 12.

At 1510, the base station may perform one of the two-step RACH procedure or the four-step RACH procedure with the UE based on the RACH procedure selection rule. The operations of 1510 may be performed according to the methods described herein. In some examples, aspects of the operations of 1510 may be performed by a RACH performance manager as described with reference to FIGS. 9 through 12.

Figure 16:
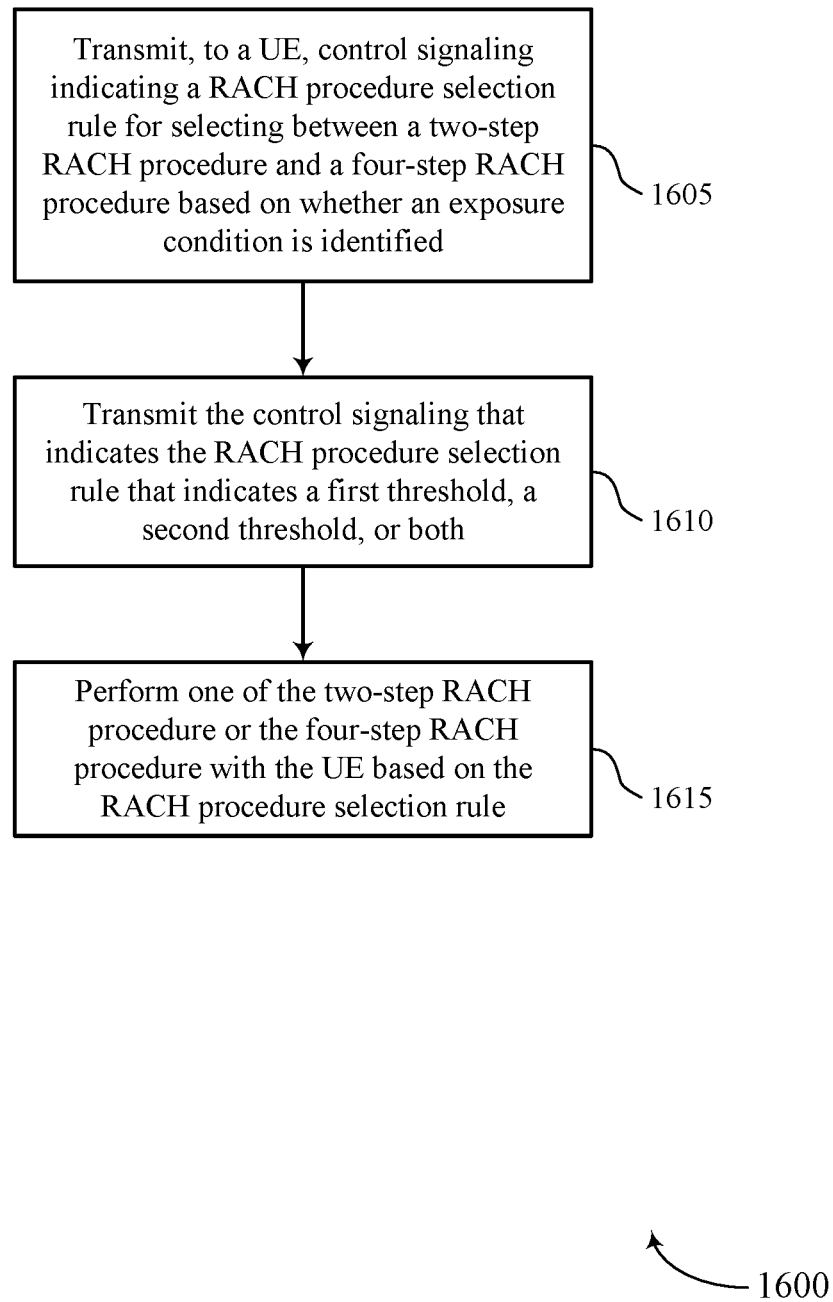

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, control signaling indicating a RACH procedure selection rule for selecting between a two-step RACH procedure and a four-step RACH procedure based on whether an exposure condition is identified. The operations of 1605 may be performed according to the methods described herein. In some examples, aspects of the operations of 1605 may be performed by a control signal manager as described with reference to FIGS. 9 through 12.

At 1610, the base station may transmit the control signaling that indicates the RACH procedure selection rule that indicates a first threshold, a second threshold, or both. The operations of 1610 may be performed according to the methods described herein. In some examples, aspects of the operations of 1610 may be performed by a RACH selection rule manager as described with reference to FIGS. 9 through 12.

At 1615, the base station may perform one of the two-step RACH procedure or the four-step RACH procedure with the UE based on the RACH procedure selection rule. The operations of 1615 may be performed according to the methods described herein. In some examples, aspects of the operations of 1615 may be performed by a RACH performance manager as described with reference to FIGS. 9 through 12.

The following provides an overview of aspects of the present disclosure:

Aspect 1: A method for wireless communications by a user equipment, comprising: identifying a random access channel (RACH) procedure selection rule for selecting between a two-step RACH procedure and a four-step RACH procedure based at least in part on whether an exposure condition is identified; selecting between the two-step RACH procedure and the four-step RACH procedure based at least in part on the RACH procedure selection rule; and performing the selected RACH procedure based at least in part on the selecting.

Aspect 2: The method of aspect 1, wherein identifying the RACH procedure selection rule comprises: receiving control signaling that indicates the RACH procedure selection rule.

Aspect 3: The method of aspect 2, wherein receiving the control signaling comprises: receiving control signaling that includes system information that indicates the RACH procedure selection rule.

Aspect 4: The method of any of aspects 1 through 3, wherein identifying the RACH procedure selection rule comprises: identifying the RACH procedure selection rule that indicates a threshold for selecting between the two-step RACH procedure and the four-step RACH procedure when the exposure condition is or is not identified.

Aspect 5: The method of any of aspects 1 through 4, wherein identifying the RACH procedure selection rule comprises: identifying the RACH procedure selection rule that indicates a first threshold for selecting between the two-step RACH procedure and the four-step RACH procedure when the exposure condition is identified and a second threshold for selecting between the two-step RACH procedure and the four-step RACH procedure when the exposure condition is not identified.

Aspect 6: The method of aspect 5, wherein identifying the RACH procedure selection rule comprises: receiving control signaling that indicates the RACH procedure selection rule that indicates the first threshold, the second threshold, or both.

Aspect 7: The method of any of aspects 5 through 6, wherein identifying the RACH procedure selection rule comprises: receiving control signaling that indicates the RACH procedure selection rule that indicates the first threshold.

Aspect 8: The method of aspect 7, further comprising: identifying the second threshold based at least in part on the first threshold.

Aspect 9: The method of any of aspects 5 through 8, wherein identifying the RACH procedure selection rule comprises: receiving control signaling that indicates the RACH procedure selection rule that indicates the second threshold.

Aspect 10: The method of aspect 9, further comprising: identifying the first threshold based at least in part on the second threshold.

Aspect 11: The method of any of aspects 5 through 10, wherein identifying the RACH procedure selection rule comprises: identifying the RACH procedure selection rule that indicates a first frequency band in which to apply the first and second thresholds.

Aspect 12: The method of aspect 11, wherein identifying the RACH procedure selection rule comprises: identifying the RACH procedure selection rule that indicates a second frequency band in which to apply at least a third threshold for selecting between the two-step RACH procedure and the four-step RACH procedure.

Aspect 13: A method for wireless communications by a base station, comprising: transmitting, to a UE, control signaling indicating a random access channel (RACH) procedure selection rule for selecting between a two-step RACH procedure and a four-step RACH procedure based at least in part on whether an exposure condition is identified; and performing one of the two-step RACH procedure or the four-step RACH procedure with the UE based at least in part on the RACH procedure selection rule.

Aspect 14: The method of aspect 13, wherein transmitting the control signaling comprises: transmitting the control signaling that includes system information that indicates the RACH procedure selection rule.

Aspect 15: The method of any of aspects 13 through 14, wherein transmitting the control signaling comprises: transmitting the control signaling that indicates the RACH procedure selection rule that indicates a threshold for selecting between the two-step RACH procedure and the four-step RACH procedure when the exposure condition is or is not identified.

Aspect 16: The method of any of aspects 13 through 15, wherein transmitting the control signaling comprises: transmitting the control signaling that indicates the RACH procedure selection rule that indicates a first threshold for selecting between the two-step RACH procedure and the four-step RACH procedure when the exposure condition is identified and a second threshold for selecting between the two-step RACH procedure and the four-step RACH procedure when the exposure condition is not identified.

Aspect 17: The method of aspect 16, wherein transmitting the control signaling comprises: transmitting the control signaling that indicates the RACH procedure selection rule that indicates a first frequency band in which to apply the first and second thresholds.

Aspect 18: The method of aspect 17, wherein transmitting the control signaling comprises: transmitting the control signaling that indicates the RACH procedure selection rule that indicates a second frequency band in which to apply at least a third threshold for selecting between the two-step RACH procedure and the four-step RACH procedure.

Aspect 19: The method of any of aspects 13 through 18, wherein transmitting the control signaling comprises: transmitting the control signaling that indicates the RACH procedure selection rule that indicates a first threshold, a second threshold, or both.

Aspect 20: An apparatus for wireless communications by a user equipment, comprising a processor; memory coupled with the processor; and instructions stored in the memory and executable by the processor to cause the apparatus to perform a method of any of aspects 1 through 12.

Aspect 21: An apparatus for wireless communications by a user equipment, comprising at least one means for performing a method of any of aspects 1 through 12.

Aspect 22: A non-transitory computer-readable medium storing code for wireless communications by a user equipment, the code comprising instructions executable by a processor to perform a method of any of aspects 1 through 12.

Aspect 23: An apparatus for wireless communications by a base station, comprising a processor; memory coupled with the processor; and instructions stored in the memory and executable by the processor to cause the apparatus to perform a method of any of aspects 13 through 19.

Aspect 24: An apparatus for wireless communications by a base station, comprising at least one means for performing a method of any of aspects 13 through 19.

Aspect 25: A non-transitory computer-readable medium storing code for wireless communications by a base station, the code comprising instructions executable by a processor to perform a method of any of aspects 13 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a user equipment, comprising:
   identifying a random access channel (RACH) procedure selection rule that indicates a first threshold for selecting between a two-step RACH procedure and a four-step RACH procedure when an exposure condition is identified and a second threshold for selecting between the two-step RACH procedure and the four-step RACH procedure when the exposure condition is not identified;
   selecting between the two-step RACH procedure and the four-step RACH procedure based at least in part on the RACH procedure selection rule; and
   performing one of the two-step RACH procedure or the four-step RACH procedure based at least in part on the selecting.

2. The method of claim 1, wherein identifying the RACH procedure selection rule comprises:
   receiving control signaling that indicates the RACH procedure selection rule.

3. The method of claim 2, wherein receiving the control signaling comprises:
   receiving control signaling that includes system information that indicates the RACH procedure selection rule.

4. The method of claim 1, wherein identifying the RACH procedure selection rule comprises:
   identifying the RACH procedure selection rule that indicates a threshold for selecting between the two-step RACH procedure and the four-step RACH procedure when the exposure condition is or is not identified.

5. The method of claim 1, wherein identifying the RACH procedure selection rule comprises:
   receiving control signaling that indicates the RACH procedure selection rule that indicates the first threshold, the second threshold, or both.

6. The method of claim 1, wherein identifying the RACH procedure selection rule comprises:
   receiving control signaling that indicates the RACH procedure selection rule that indicates the first threshold.

7. The method of claim 6, further comprising:
   identifying the second threshold based at least in part on the first threshold.

8. The method of claim 1, wherein identifying the RACH procedure selection rule comprises:
   receiving control signaling that indicates the RACH procedure selection rule that indicates the second threshold.

9. The method of claim 8, further comprising:
   identifying the first threshold based at least in part on the second threshold.

10. The method of claim 1, wherein identifying the RACH procedure selection rule comprises:
    identifying the RACH procedure selection rule that indicates a first frequency band in which to apply the first and second thresholds.

11. The method of claim 10, wherein identifying the RACH procedure selection rule comprises:
    identifying the RACH procedure selection rule that indicates a second frequency band in which to apply at least a third threshold for selecting between the two-step RACH procedure and the four-step RACH procedure.

12. An apparatus for wireless communications by a user equipment, comprising:
    a processor,
    a memory coupled with the processor; and
    instructions stored in the memory and executable by the processor to cause the apparatus to:
      identify a random access channel (RACH) procedure selection rule that indicates a first threshold for selecting between a two-step RACH procedure and a four-step RACH procedure when an exposure condition is identified and a second threshold for selecting between the two-step RACH procedure and the four-step RACH procedure when the exposure condition is not identified;
      select between the two-step RACH procedure and the four-step RACH procedure based at least in part on the RACH procedure selection rule; and
      perform one of the two-step RACH procedure or the four-step RACH procedure based at least in part on the selecting.

13. The apparatus of claim 12, further comprising a receiver, wherein the instructions to identify the RACH procedure selection rule are executable by the processor to cause the apparatus to:
    receive, via the receiver, control signaling that indicates the RACH procedure selection rule.

14. The apparatus of claim 13, wherein the instructions to receive the control signaling are executable by the processor to cause the apparatus to:

receive control signaling that includes system information that indicates the RACH procedure selection rule.

15. The apparatus of claim 12, wherein the instructions to identify the RACH procedure selection rule are executable by the processor to cause the apparatus to:
identify the RACH procedure selection rule that indicates a threshold for selecting between the two-step RACH procedure and the four-step RACH procedure when the exposure condition is or is not identified.

16. The apparatus of claim 12, wherein the instructions to identify the RACH procedure selection rule are executable by the processor to cause the apparatus to:
receive control signaling that indicates the RACH procedure selection rule that indicates the first threshold, the second threshold, or both.

17. The apparatus of claim 12, wherein the instructions to identify the RACH procedure selection rule are executable by the processor to cause the apparatus to:
receive control signaling that indicates the RACH procedure selection rule that indicates the first threshold.

18. The apparatus of claim 17, wherein the instructions are further executable by the processor to cause the apparatus to:
identify the second threshold based at least in part on the first threshold.

19. The apparatus of claim 12, wherein the instructions to identify the RACH procedure selection rule are executable by the processor to cause the apparatus to:
receive control signaling that indicates the RACH procedure selection rule that indicates the second threshold.

20. The apparatus of claim 19, wherein the instructions are further executable by the processor to cause the apparatus to:
identify the first threshold based at least in part on the second threshold.

21. A method for wireless communications by a base station, comprising:
transmitting, to a user equipment (UE), control signaling indicating a random access channel (RACH) procedure selection rule that indicates a first threshold for selecting between a two-step RACH procedure and a four-step RACH procedure when an exposure condition is identified and a second threshold for selecting between the two-step RACH procedure and the four-step RACH procedure when the exposure condition is not identified; and
performing one of the two-step RACH procedure or the four-step RACH procedure with the UE based at least in part on the RACH procedure selection rule.

22. The method of claim 21, wherein transmitting the control signaling comprises:
transmitting the control signaling that includes system information that indicates the RACH procedure selection rule.

23. The method of claim 21, wherein transmitting the control signaling comprises:
transmitting the control signaling that indicates the RACH procedure selection rule that indicates a threshold for selecting between the two-step RACH procedure and the four-step RACH procedure when the exposure condition is or is not identified.

24. The method of claim 21, wherein transmitting the control signaling comprises:
transmitting the control signaling that indicates the RACH procedure selection rule that indicates a first frequency band in which to apply the first and second thresholds.

25. The method of claim 24, wherein transmitting the control signaling comprises:
transmitting the control signaling that indicates the RACH procedure selection rule that indicates a second frequency band in which to apply at least a third threshold for selecting between the two-step RACH procedure and the four-step RACH procedure.

26. The method of claim 21, wherein transmitting the control signaling comprises:
transmitting the control signaling that indicates the RACH procedure selection rule that indicates a first threshold, a second threshold, or both.

27. An apparatus for wireless communications by a base station, comprising:
a processor;
a memory coupled with the processor; and
instructions stored in the memory and executable by the processor to cause the apparatus to:
transmit, to a user equipment (UE), control signaling indicating a random access channel (RACH) procedure selection rule that indicates a first threshold for selecting between a two-step RACH procedure and a four-step RACH procedure when an exposure condition is identified and a second threshold for selecting between the two-step RACH procedure and the four-step RACH procedure when the exposure condition is not identified; and
perform one of the two-step RACH procedure or the four-step RACH procedure with the UE based at least in part on the RACH procedure selection rule.

28. The apparatus of claim 27, further comprising a transmitter, wherein the instructions to transmit the control signaling are executable by the processor to cause the apparatus to:
transmit the control signaling that includes system information that indicates the RACH procedure selection rule.

29. The apparatus of claim 27, wherein the instructions to transmit the control signaling are executable by the processor to cause the apparatus to:
transmit the control signaling that indicates the RACH procedure selection rule that indicates a first frequency band in which to apply the first and second thresholds.

30. The apparatus of claim 29, wherein the instructions to transmit the control signaling are executable by the processor to cause the apparatus to:
transmit the control signaling that indicates the RACH procedure selection rule that indicates a second frequency band in which to apply at least a third threshold for selecting between the two-step RACH procedure and the four-step RACH procedure.

\* \* \* \* \*